US008595337B2

(12) United States Patent
Beppu

(10) Patent No.: US 8,595,337 B2
(45) Date of Patent: Nov. 26, 2013

(54) COMPUTER LINK METHOD AND COMPUTER SYSTEM

(75) Inventor: Yasuyuki Beppu, Tokyo (JP)

(73) Assignee: NEC Corporation, Tokyo (JP)

( * ) Notice: Subject to any disclaimer, the term of this patent is extended or adjusted under 35 U.S.C. 154(b) by 526 days.

(21) Appl. No.: 12/735,999

(22) PCT Filed: Mar. 10, 2009

(86) PCT No.: PCT/JP2009/001055
§ 371 (c)(1),
(2), (4) Date: Aug. 31, 2010

(87) PCT Pub. No.: WO2009/113293
PCT Pub. Date: Sep. 17, 2009

(65) Prior Publication Data
US 2010/0325251 A1    Dec. 23, 2010

(30) Foreign Application Priority Data

Mar. 13, 2008  (JP) .................................. 2008-064083

(51) Int. Cl.
*G06F 15/177* (2006.01)
(52) U.S. Cl.
USPC .......................................................... 709/221
(58) Field of Classification Search
USPC .......................................................... 709/221
See application file for complete search history.

(56) References Cited

U.S. PATENT DOCUMENTS

| 5,031,089 | A | * | 7/1991 | Liu et al. ........................ 709/226 |
| 5,539,883 | A | * | 7/1996 | Allon et al. .................... 718/105 |
| 2002/0091786 | A1 | | 7/2002 | Yamaguchi et al. |

FOREIGN PATENT DOCUMENTS

| JP | 01-191252 | 8/1989 |
| JP | 05-216845 | 8/1993 |
| JP | 8-185377 | 7/1996 |
| JP | 2002-140202 A | 5/2002 |
| JP | 2002-278823 | 9/2002 |
| JP | 2005-252596 | 9/2005 |
| JP | 2007-206987 A | 8/2007 |
| JP | 2007-265043 A | 10/2007 |
| WO | WO 2008/021024 A2 | 2/2008 |

OTHER PUBLICATIONS

Ratnasamy, et al., "A Scalable Content-Addressable Network," SIGCOMM'01 (Aug. 27, 2001), http://www.sigcomm.org/sigcomm2001/p13-ratnasamy.pdf, pp. 1-13.
Japanese Office Action, dated Apr. 8, 2013 with English translation.

* cited by examiner

*Primary Examiner* — Benjamin R Bruckart
*Assistant Examiner* — SM Rahman
(74) *Attorney, Agent, or Firm* — McGinn IP Law Group, PLLC

(57) ABSTRACT

A computer system includes: a load information exchanging unit that exchanges load information on a regular basis to find a problem in a load distribution server on the other end of a link; a problem information communicating unit that transmits the information about the problem to a directory server (100); a problem information collecting unit (120) that receives the information and transfers the information to a problem information analyzing unit (130); and the problem information analyzing unit (130) of the directory server (100). As the problem information analyzing unit (130) determines that load accommodation links should be re-formed among load distribution servers, each load distribution server can secure two or more links. Accordingly, even when a problem is caused in a load distribution server, the connectivity among the load distribution servers is maintained, and there is no need to reconstruct the entire set of load distribution servers.

55 Claims, 24 Drawing Sheets

COMPUTER LINK METHOD AND COMPUTER SYSTEM

TECHNICAL FIELD

The present invention relates to a computer link method for linking computers in a computer system in which the computers such as load distribution servers cooperate with one another, and a computer system, a computer, a directory server, and a storage medium that can be suitably used according to the computer link method.

BACKGROUND ART

There has been a computer system in which computers such as load distribution servers cooperate with one another. Non-Patent Document 1 discloses an example of a distribution infrastructure system as this type of computer system. This distribution infrastructure system is called "CAN".

As shown in FIG. 21, this distribution infrastructure system includes: zone dividing servers that are a zone dividing server 1 (1100) from and into which servers can read and write data, a zone dividing server 2 (1200) from and into which servers can read and write data, a zone dividing server 3 (1300) from and into which servers can read and write data, a zone dividing server 4 (1400) from and into which servers can read and write data, and a zone dividing server 5 (1500) from and into which servers can read and write data; and a network 700 that connects the zone dividing servers 1 (1100) through 5 (1500) to one another. The network 700 may further include a zone dividing server having the same functions as the zone dividing servers 1 (1100) through 5 (1500).

The zone dividing servers 1 (1100) through 5 (1500) have the same components as one another. For example, the zone dividing server 1 (1100) includes a node finding unit 1110, a zone dividing unit 1120, a communicating unit 1130, a neighbor managing unit 1140, a problem solving unit 1150, and a reconstructing unit 1160. The node finding unit 1110 is used to find the existing other zone dividing servers and the likes when the zone dividing server joins the distribution infrastructure system, or to find another zone dividing server when the other zone dividing server joins the distribution infrastructure system, or the like.

After joining the distribution infrastructure system, the zone dividing unit 1120 is used to divide the zone of data to be read or written by servers. For example, when the zone dividing server 1 is assigned to reading and writing all data, the zone dividing unit 1120 serves to divide the zone, so that the zone dividing server 1 is assigned to reading and writing data 0% to 50% in humidity, and the zone dividing server 2 is assigned to reading and writing data of 51% to 100% in humidity.

When a zone is divided, the communicating unit 1130 functions to notify the other zone dividing servers of the division. While a two-dimensional space is divided and the dividing servers in the CAN is assigned to the respective zone, the neighbor managing unit 1140 manages the IP (Internet Protocol) address information about neighboring zone dividing servers, and the information about which zone dividing servers are in the neighborhood of other dividing servers in the two-dimensional space.

When a zone dividing server leaves the system, the problem solving unit 1150 determines which one of the remaining zone dividing servers is assigned to the zone to which the server that has left the system used to be assigned. After a few servers have left the system, the reconstructing unit 1160 reconstructs zone dividing servers so that the zone dividing server is assigned to a zone that is one branch of a binary tree.

The distribution infrastructure system having such a structure operates in the following manner (see FIG. 22). Each existing zone dividing server is assigned to a zone in a two-dimensional space, and is used to read the data stored in the zone when data to be put into that zone is written from outside. The zones are divided and managed on a two-dimensional map.

When a new zone dividing server 5 (1500) joins the network formed with the existing four zone dividing servers, the node finding unit 1510 first needs to find one of the four nodes. This can be done by providing the IP address of one of the zone dividing servers in the existing network as a configuration file.

A check is then made to determine which zone in the distribution infrastructure system can be divided. As can be seen from FIG. 22, the zone of the zone dividing server 4 can be divided in this case. The zone dividing unit 1420 of the zone dividing server 4 (1400) divides the zone, and the communicating unit 1530 notifies that the new zone dividing server 5 has joined the network. The zone dividing server 4 (1400) causes the neighbor managing unit 1440 to update its neighboring zone dividing servers, and the servers neighboring the neighboring zone dividing servers.

When a node leaves the CAN, the written data is transferred to another node. At this point, if the written data can be appropriately transferred to one of the neighboring nodes, and the one node forms one zone, the written data is transferred to such a node. If such a node does not exist, the neighboring node having the smallest zone area takes over both its own zone and the left zone. When a zone dividing server leaves, a neighboring node takes over the zone. However, in determining which node is to take over the zone, the candidate nodes are the nodes neighboring the node that has left, and therefore, the candidate nodes are the node that neighbors the own node but has left, and the zone dividing server neighboring the node that has left.

To perform this takeover, the neighbor managing unit needs to manage the information about the neighboring nodes and the information about the nodes neighboring the neighboring nodes. As a result, the amount of information to be managed by the neighbor managing unit in each one node becomes larger. The zones may be divided as shown in FIG. 23, and may be managed by zone dividing servers 1 through 11.

If the zone dividing server 9 leaves, the problem solving unit functions, and the node having the smallest area assigned thereto among the nodes neighboring the zone dividing server 9 takes over. In this case, there is a possibility that any of the zone dividing servers 6, 7, 10, and 11 takes over. However, if the zone dividing server 6 takes over, reconstruction is necessary. This is because the situation prior to the takeover is like the situation represented by a binary tree shown in FIG. 24. If the node 6 manages both the zones of 6 and 9, the load on the node 6 becomes undesirably heavy, since the nodes 6 and 9 are divided at the first branching of the binary tree, and the node 6 appears at the two ends of the binary tree.

In an example operation by the reconstructing unit in this case, the node 11 is assigned to the zones of 10 and 11, and the node 10 takes over the zone originally assigned to 9. However, performing reconstruction causes the following problem. While a reconstructing operation is being performed, writing and reading cannot be properly performed on the zones related to the reconstruction, resulting in a practical problem.

In a case where an algorithm of recovery from a problem is applied, the zones managed by one zone dividing server include more than one end in the tree structure map, which is problematic in management. Therefore, if a recovery algorithm is applied when a problem is caused in a zone dividing server in the distribution infrastructure system, it is necessary to reconstruct the entire zones on a regular basis.

If writing or reading is performed on a zone related to reconstruction while the reconstruction is being performed, the consistency is lost. Therefore, writing and reading cannot be performed during the reconstruction, and there is a delay in response time to the writing and reading when a problem is caused.

Also, when a zone dividing server leaves, a neighboring node takes over the zone. In determining which node should take over the zone, the candidate nodes are the node that was in the neighborhood of the own server and has left, and the zone dividing server in the neighborhood of the node that has left. Therefore, it is necessary to transfer the node information to all of those nodes.

Therefore, each zone dividing server in the distribution infrastructure system needs to hold the information about the zone distribution servers in the neighborhood of the own server, and the information about the zone distribution servers in the neighborhood of the neighboring zone dividing servers. As a result, each component in the distribution infrastructure system needs to manage a large amount of information. If a change is made to a zone dividing server, it is necessary to notify a large number of zone dividing servers of the change, and the amount of communications increases.

Meanwhile, Patent Document 1 discloses a load distribution method by which a server with high access frequency is detected, and content is transferred to servers with smaller loads. However, Patent Document 1 merely discloses a load distribution method for simply transferring loads, and does not teach a method for coping with the above described problems of a delay in response time and an increase in the amount of communications. Patent Document 2 discloses a network construction method by which a switcher determines to which and from which an object should be connected, and transmits a switching signal to the object to change links. However, the switcher still keeps a link, and the invention was not developed to cope with a case where a physical problem is caused in the switcher.

[Non-Patent Document 1] Sylvia Ratnasamy, et al., "A Scalable Content-Address Network", http://www.sigcomm.org/sigcomm2001/p13-ratnasamy.pdf, Aug. 27, 2001

[Patent Document 1] Japanese Laid-Open Patent Publication No. 2002-278823

[Patent Document 2] Japanese Laid-Open Patent Publication No. 2005-252596

DISCLOSURE OF THE INVENTION

An object of the present invention is to prevent a delay in response time when a problem is caused in a computer in a computer system in which computers cooperate with one another. Another object of the present invention is to reduce the amount of communications when the computer system is constructed.

According to the present invention, there is provided a computer link method for linking a plurality of computers cooperating with one another, including: linking each computer among the computers to another computer among the computers; comparing load information indicating a processing load on the computer with load information indicating a processing load on the another computer; and forming at least two load accommodation links for transferring at least part of an operation being performed from one of the computers with a larger processing load indicated by the load information to one of the computers with a smaller processing load indicated by the load information.

According to the present invention, there is provided a computer system including a plurality of computers that cooperate with one another, each of the computers includes: a load information exchanging unit that is connected to another computer among the computers excluding the computer, compares load information indicating a processing load on the computer with load information indicating a processing load on the another computer, and forms a load accommodation link transferring at least part of an operation being performed from one of the computers with a larger processing load indicated by the load information to one of the computers with a smaller processing load indicated by the load information; and a load accommodation link managing unit that causes the load information exchanging unit to form at least two or more of the load accommodation links.

According to the present invention, there is provided a computer that cooperates with another computer, including: a load information exchanging unit that is connected to the another computer, compares load information indicating a processing load on the computer with load information indicating a processing load on the another computer, and forms a load accommodation link transferring at least part of an operation being performed from a computer with a larger processing load indicated by the load information to a computer with a smaller processing load indicated by the load information; and a load accommodation link managing unit that causes the load information exchanging unit to form at least two or more of the load accommodation links.

According to the present invention, there is provided a directory server that manages a plurality of computers cooperating with one another, including a storage unit that stores a flag management table formed by collecting and unifying specified value flags each indicating whether each corresponding one of the computers can further accept a load accommodation link, the load accommodation link being transferring at least part of an operation being performed by one of the computers from one of the computers with a larger processing load to one of the computers with a smaller processing load among the computers.

According to the present invention, there is provided a storage medium that stores a program to be executed by a computer that cooperates with another computer, the storage medium storing a program that causes the computer to: connect to the another computer; compare load information indicating a processing load on the computer with load information indicating a processing load on the another computer; and format least two load accommodation links for transferring at least part of an operation being performed from a computer with a larger processing load indicated by the load information to a computer with a smaller processing load indicated by the load information.

According to the present invention, there is provided a storage medium that stores a program to be executed by a server that manages a plurality of computers cooperating with one another, the storage medium storing a program that causes the server to: store a flag management table formed by collecting and unifying specified value flags each indicating whether each corresponding one of the computers can further accept a load accommodation link, the load accommodation link being transferring at least part of an operation being performed from one of the computers with a larger processing load indicated by load information to one of the computers with a smaller processing load indicated by the load information, the load information indicating the processing load being compared with one another among the computers.

By the computer link method according to the present invention, a delay in response time can be prevented when a problem is caused in a computer in a computer system in which computers cooperate with one another. By the computer link method according to the present invention, the amount of communication at the time of computer system construction can be restrained. The present invention can also provide a computer system that is suitable for implementing the computer link method. The present invention can also provide a computer that is suitable for constructing the computer system. The present invention can also provide a storage medium that stores a program that is suitable for constructing the computer.

BRIEF DESCRIPTION OF THE DRAWINGS

The above mentioned objects and other objects, and features and advantages of the present invention will become more apparent from the following detailed description when read in conjunction with the accompanying drawings.

BEST MODE FOR CARRYING OUT THE INVENTION

Figure 1:
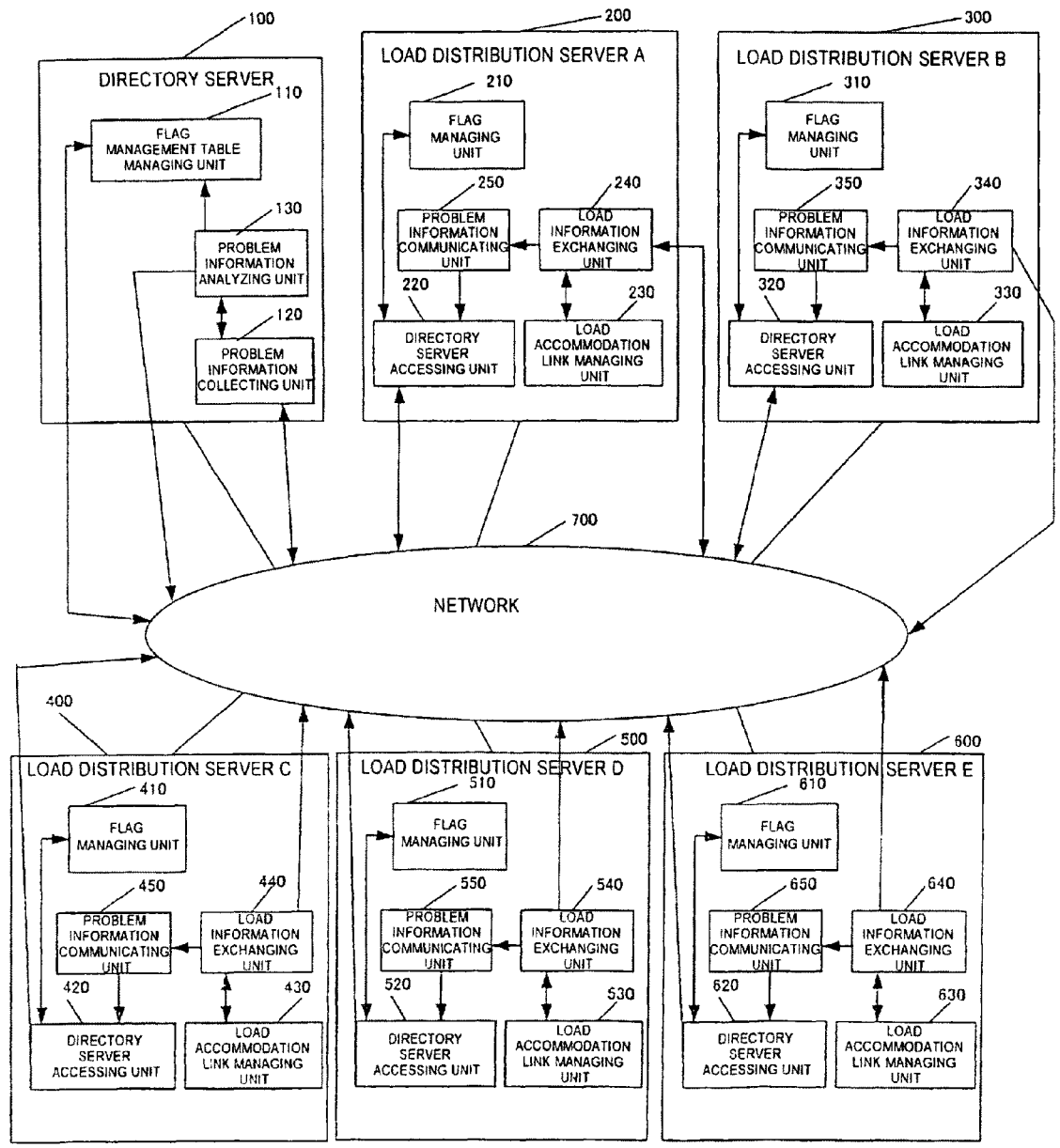
FIG. 1 is a block diagram of a computer system that is used in a computer link method according to an embodiment of the present invention.

The following is a description of a computer link method, a computer system, a computer, and a program according to embodiments of the present invention. In the drawings, like components are denoted by like reference numerals. FIG. 1 is a block diagram of a computer system that is used by a computer link method according to an embodiment of the present invention.

A computer system 1000 according to the embodiment shown in FIG. 1 is an example of a distribution infrastructure system that performs load distribution with servers (load distribution servers), and more particularly, an example of a computer system 1000 in which the number of servers for the load distribution can be increased even by one as needed, and the servers for the load distribution have links for load accommodation. Even when a problem occurs in a server for the load distribution, the computer system 1000 can continue to provide services.

In FIG. 1, the computer system 1000 includes: a directory server 100 that manages the states of the load distribution servers; the load distribution servers that cooperate with one another (a load distribution server A200 that distributes and processes the load on the load distribution server group, a load distribution server B300 that distributes and processes the load on the load distribution server group, a load distribution server C400 that distributes and processes the load on the load distribution server group, a load distribution server D500 that distributes and processes the load on the load distribution server group, and a load distribution server E600 that distributes and processes the load on the load distribution server group); and a network 700 that connects the load distribution servers to one another. Although the five load distribution servers A200 through E600 are shown in FIG. 1, more load distribution servers having the same functions may be included.

The load distribution server A200 includes a load information exchanging unit 240 that is connected to one of the load distribution servers B300 through E600, compares the processing loads indicated by load information about the load distribution servers with each other, and forms a load accommodation link for transferring at least part of an operation being performed from the load distribution server with the larger processing load to the load distribution server with the smaller processing load indicated by the load information. The load distribution server A200 also includes a load accommodation link managing unit 230 that causes the load information exchanging unit 240 to form at least two or more load accommodation links. Here, the load distribution server A200 forms a load accommodation link with the load distribution server B300, and the load distribution server B300 forms a load accommodation link with the load distribution server C400.

The load accommodation link managing unit 230 generates a specified value flag that indicates whether the server (the load distribution server A200) can accept more load accommodation links, and stores the specified value flag into a storage medium. The specified value flag generated by the load accommodation link managing unit 230 may be stored into a flag managing unit 210 included in the load distribution server A200, or may be stored into a flag management table managing unit 110 included in the directory server 100. The flag management table managing unit 110 will be described later in detail.

The flag managing unit 210 may contain a storage medium (not shown), and may manage the flag stored in the storage medium. The flag managed by the flag managing unit 210 indicates the state of the load distribution server, and may indicate one of the following states: (1) a state where the load distribution server is not currently connected to another load distribution server; (2) a state where the load distribution server is connected to two or more load distribution servers (an ON state); and (3) a state where the load distribution server is connected only one or less load distribution server but is regarded as being connected to another load distribution server, or a state where the load distribution server is prepared to accept links from other load distribution servers but the number of links is one and has not reached two yet (a dummy ON state). In this embodiment, the load distribution server A200 forms a load accommodation link with the load distribution server B300, and therefore, the flag managing unit 210 holds the flag indicating the state of (3).

To cause the load information exchanging unit 240 to form a load accommodation link, the load accommodation link managing unit 230 confirms that the specified value flag generated by the server on the other end of the connection indicates that load accommodation links can be accepted. The load accommodation link managing unit 230 then causes the load information exchanging unit 240 to form a load accommodation link.

There are two kinds of load accommodation links: active links that actively link to other load distribution servers, and passive links that are passively linked from other load distribution servers. A maximum active link number as the upper limit of the number of active links and a maximum link number as the upper limit of the number of links linkable with other load distribution servers are set as specified values in advance. Links can be formed within the range defined by those specified values. The above described specified value flag is a flag that indicates whether the number of links has reached the maximum link number. If the number of links has reached the maximum link number, the specified value flag is checked.

Here, the load accommodation link managing unit 230 may perform management, with the upper limit of the number of active links formed between the server and other servers among load accommodation links being set at 2. With this arrangement, where the load distribution server A200 has actively formed two load accommodation links, the load distribution server A200 can properly transfer the processing load without a problem, even if one of the load accommodation links is cut off due to a problem in the server on the other end of the connection. Also, with the upper limit of the number of active links being set at 2, the number of load accommodation links is restricted to the minimum necessary number (two) as redundant configurations. Accordingly, an unnecessary increase in the communication amount of the load distribution server A200 can be prevented.

The load accommodation link managing unit 230 may perform management, with the upper limit of the number of load accommodation links including passive links formed between the server and other servers being set at 4. With this arrangement, concentration of load accommodation links on one server can be prevented. Accordingly, load accommodation links can be efficiently formed, and a recovery from a problem can be effectively made by a local re-link.

The problem information communicating unit 250 generates problem information indicating that a problem might have occurred in the server (the load distribution server A200) or the load distribution server B300 (a link computer) forming a load accommodation link, based on the load information. The load distribution server A200 outputs the problem information generated by the load information exchanging unit 240 to the directory server 100 (to the outside) via a directory server accessing unit 220. At this point, the load information exchanging unit 240 re-forms a load accommodation link in accordance with a re-link instruction from the directory server 100.

If the problem information communicating unit 250 does not receive the load information about the load distribution server B300 within a predetermined period of time from the load distribution server B300, the problem information communicating unit 250 generates the problem information.

The directory server accessing unit 220 provides a function for the components of the load distribution server A200 to access the directory server 100 via a network, and holds the IP address of the directory server 100 as configuration information.

The load accommodation link managing unit 230 holds the server name and ID address of the load distribution server B300 forming a load accommodation link to the load distribution server A200 (the server), and an IN/OUT type that is formed either with "OUT" indicating that the server has formed the link to the other end (active) or with "IN" indicating that the other end has formed the link to the server (passive). The address of each load distribution server may not necessarily be an IP address, and may be a MAC address or the like, depending on the system configuration.

The load information exchanging unit 240 exchanges the load information with other load distribution servers in a relation of connection held by the load accommodation link managing unit 230, and performs a load accommodation from a load distribution server with a large load to a load distribution server with a small load.

When a load information acquirement request at the load information exchanging unit 240 has a time-out (or when a response is not returned over a predetermined period of time after the load information exchanging unit 240 requests transmitting the load information from another linked load distribution server), the problem information communicating unit 250 senses a probability that there is a problem in the load distribution server on the receiving end of the request. The problem information communicating unit 250 then notifies the directory server 100 of the information about the load distribution server B300 having had the time-out held by the load accommodation link managing unit 230 (or the load distribution server C400) via the directory server accessing unit 220.

Like the load distribution server A200, the load distribution server B300 includes a flag managing unit 310, a problem information communicating unit 350, a directory server accessing unit 320, a load information exchanging unit 340, and a load accommodation link managing unit 330. The load distribution server C400 also includes a flag managing unit 410, a problem information communicating unit 450, a directory server accessing unit 420, a load information exchanging unit 440, and a load accommodation link managing unit 430. Further, like the load distribution server A200, the load distribution server D500 includes a flag managing unit 510, a problem information communicating unit 550, a directory server accessing unit 520, a load information exchanging unit 540, and a load accommodation link managing unit 530. Further, the load distribution server E600 also includes a flag managing unit 610, a problem information communicating unit 650, a directory server accessing unit 620, a load information exchanging unit 640, and a load accommodation link managing unit 630.

The directory server 100 is a computer that manages computers (the load distribution servers A200 through E600 in this embodiment) that cooperate with each other. The directory server 100 has high reliability through multiplexing or the like, and the probability that a problem is caused in the directory server 100 is so small that it can be ignored.

The directory server 100 includes the flag management table managing unit 110 that stores and manages a flag management table formed by collecting and unifying the specified value flags indicating whether the respective load distribution servers A200 through E600 can accept more load accommodation links for transferring at least part of an operation being performed by one of the load distribution servers A200 through E600 from a load distribution server with a large processing load to a load distribution server with a small processing load among the load distribution servers A200 through E600 (or whether links can be accepted). The flag management table managing unit 110 contains a storage medium (not shown) that stores at least the flag management table.

The flag management table managing unit 110 performs management of the flag management table, such as changing the contents. The flag management table managed by the flag management table managing unit 110 may store the server names and IP (Internet Protocol) addresses of the load distribution servers A200 through E600, or link completion flags indicating whether the server is linked to or from another load distribution server (already linked or not), as well as the above described specified value flags. In the flag management table of this embodiment, each server having the link completion flag set at "ON" and the specified value flags not checked can accept links, and servers having the flags in any other states cannot accept links. The address of each load distribution server is not necessarily an IP address, and may be a MAC (Media Access Control) address or the like, depending on the system configuration.

The directory server 100 further includes a problem information collecting unit 120 that collects the problem information indicating that a problem might have been caused in the load distribution server B300 (a link computer) from the load distribution servers A200 through E600, and identifies the problematic computer that has the problem. The directory server 100 further includes a problem information analyzing unit 130 that analyzes the problem information collected by the problem information collecting unit 120, and issues a re-link instruction to the computer forming a load accommodation link with the problematic computer, to instruct the computer to re-form a load accommodation link.

If the problem information collecting unit 120 has collected the problem information about same computer within a certain period of time, the problem information collecting unit 120 identifies the computer as a problematic computer.

For example, if the problem information collecting unit 120 identifies the load distribution server B300 as a problematic computer, the problem information analyzing unit 130 analyzes the information received by the problem information collecting unit 120 about the load distribution server B300 (the load distribution server having the problem), and the information about the load distribution server C400 linked to the load distribution server B300. The problem information collecting unit 120 then specifically determines which two distribution servers re-form a load accommodation link in between to recover from the problem, and notifies the load distribution server C400 of the result of the determination.

The problem information analyzing unit 130 may cause the load information exchanging unit 240 having a load accommodation link with the load distribution server B300 (the problematic computer) to re-form load accommodation links. The problem information analyzing unit 130 may also cause the load distribution server A200 and the load distribution server C400 having load accommodation links with the load distribution server B300 (the problematic link) to maintain the number of active load accommodation links (active links) and the number of passive load accommodation links (passive links) formed by the load distribution server A200 prior to the occurrence of the problem. The problem information analyzing unit 130 may further cause the load distribution server A200 and the load distribution server C400 having load accommodation links with the load distribution server B300 (the problematic computer) to re-form load accommodation links with another computer each other. The problem information analyzing unit 130 may further cause the load distribution server A200 or the load distribution server C400 having a load accommodation link with the load distribution server B300 (the problematic computer), whichever has a smaller number of load accommodation links, to preferentially re-form a load accommodation link. The operations of the problem information analyzing unit 130 described herein are not limited to the case where the load distribution server B300 is identified as a problematic computer, but may also be applied to cases where any of the load distribution server A200, the load distribution server C400, the load distribution server D500, and the load distribution server E600 is identified as a problematic computer.

The computer system 1000 of this embodiment assigns the load distribution servers A200 through E600 to predetermined regions (such as the Hokkaido region, the Tohoku region, and the Kanto region), and distributes the load of each region among the load distribution servers. The load on the load distribution server assigned to a region with a large load is accommodated by a load distribution server assigned to a region with a small load.

All of or some of the components included in the load distribution servers A200 through E600 and the directory server 100 described so far may be realized by hardware or may be realized by a program (or program codes) for causing a processor to perform processing.

When the components included in the load distribution server A200 are embodied by a program, the program is stored in a storage medium that can be read by the load distribution server A200 (a computer). The program causes the load distribution server A200 to connect to another server, compare the load information indicating the processing load thereof with the load information indicating the processing load of the other server, and form two or more load accommodation links for transferring at least part of an operation being performed from the load distribution server with the large processing load indicated by the load information to the load distribution server with the small processing load indicated by the load information. The program also causes the load distribution server A200 to generate the problem information indicating that a problem might have been caused in one of the link computers forming load accommodation links with the subject computer based on the load information, output the generated problem information through a load information exchanging process, and re-form a load accommodation link in accordance with a re-link instruction from outside.

Where the components included in the directory server 100 are embodied by a program, the program is stored in a storage medium that can be read by the directory server 100 (a server). The program causes the directory server 100 to compare the load information indicating the respective processing loads with one another among the load distribution server A200, the load distribution server B300, the load distribution server C400, the load distribution server D500, and the load distribution server E600 (computers), and store the flag management table formed by collecting and unifying the specified value flags indicating whether the load distribution server A200, the load distribution server B300, the load distribution server C400, the load distribution server D500, and the load distribution server E600 (the respective computers) can accept more load accommodation links for transferring at least part of an operation being performed from a load distribution server with a large processing load indicated by the load information to a load distribution server with a small processing load indicated by the load information. The program also causes the directory server 100 to identify the problematic computer having the problem by collecting, from each computer, the problem information indicating that a problem might have been caused in one of the load distribution server A200, the load distribution server B300, and the load distribution server C400 (link computers) forming load accommodation links among the computers, and issue a re-link instruction to instruct the computer forming a load accommodation link with the problematic computer to re-form a load accommodation link by analyzing the problem information collected through a problem information collecting process.

A load distribution processing operation to be performed by the computer system 1000 having the above described structure is now roughly explained. Where the load distribution server A200 is assigned to the processing of the load of the Kanto region while the load distribution server B300 is assigned to the processing of the load of the Kansai region, as a general rule, the load distribution server A200 performs the processing when a member living in the Kanto region requests load processing such as data processing, and the load distribution server B300 performs the processing when a member living in the Kansai region requests load processing such as data processing.

In a situation where the load on the load distribution server A200 is larger than the load on the load distribution server B300 by a predetermined amount or more, when a member living in the Kanto region requests load processing such as data processing, a predetermined amount in the load on the load distribution server A200 is accommodated by the load distribution server B300, so that the load distribution server B300 processes the predetermined amount. In this manner, the loads on the respective load distribution servers are evenly distributed and processed.

Next, a processing method for putting a link between load distribution servers is described.

Figure 2:
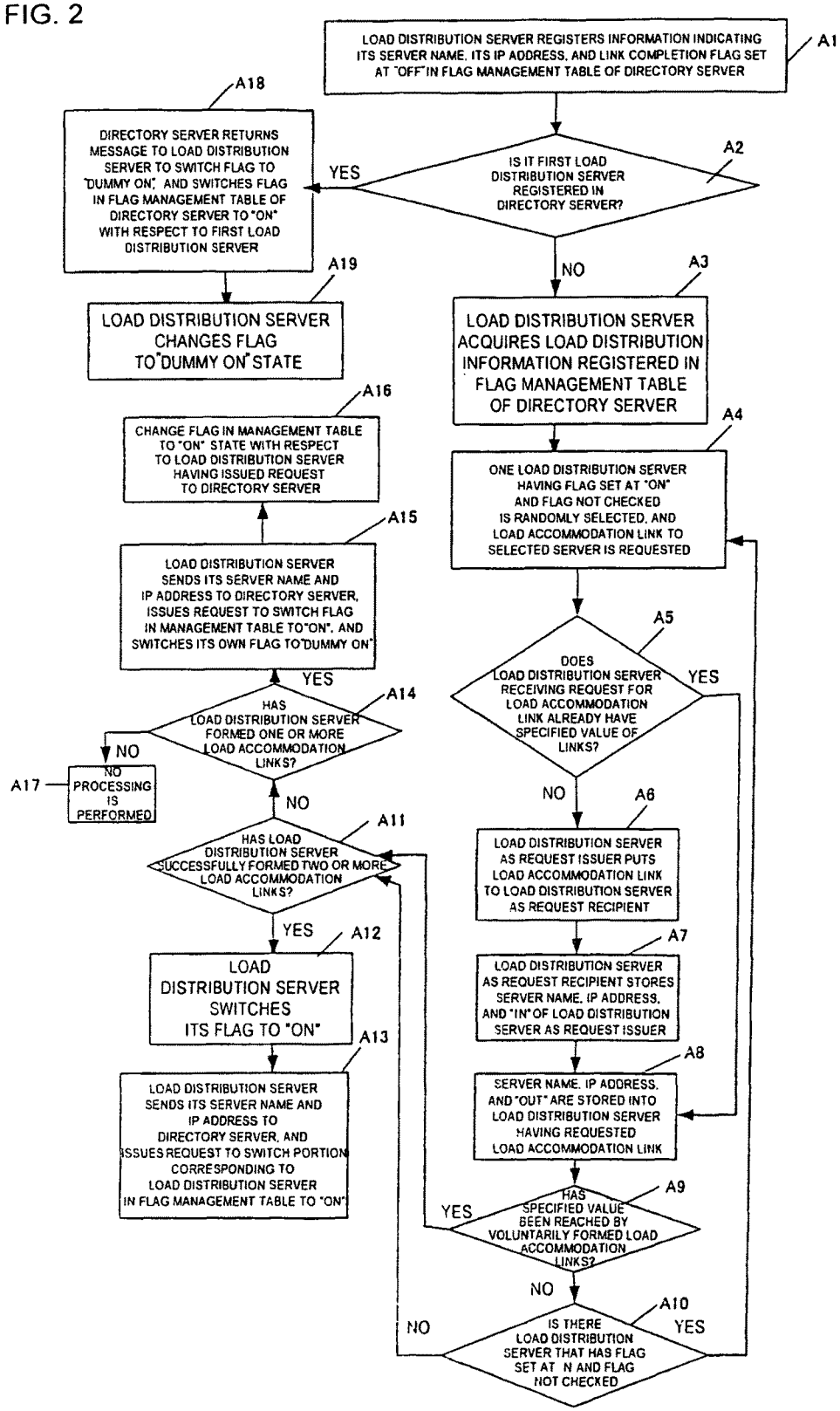
FIG. 2 is a flowchart showing the flow in an operation to add a server and put a load accommodation link in the embodiment of the present invention.

FIG. 2 is a flowchart showing a processing method for putting a link (a load accommodation link for accommodating a load in this embodiment) according to this embodiment.

In FIG. 2, the directory server accessing unit of a load distribution server registers the information about the server in the flag management table managed by the flag management table managing unit 110 of the directory server 100 (step A1 of FIG. 2). The information about the server is the server name of the server, the IP address of the server, and the information about the link completion flag set at "OFF" (indicating that the server is not connected to another distribution processing server).

The directory server 100 then determines whether the load distribution server registered in the flag management table is the load distribution server first registered in the directory server 100 (step A2 of FIG. 2). If the determination result of step A2 is "YES", the load distribution server is the load distribution server (the load distribution server A200 in this embodiment) first linked to the directory server 100 via the network 700.

The directory server 100 returns a message to the load distribution server A200, to switch the flag managed by the flag managing unit 210 to "dummy ON". The flag management table managing unit 110 of the directory server 100 switches the link completion flag in the flag management table to "ON" with respect to the load distribution server A200, and holds the link completion flag with the IP address of the load distribution server A200 (step A18 of FIG. 2).

As the link completion flag about the load distribution server A200 in the flag management table is switched to "ON", the flags indicate that links can be accepted.

The link completion flag in the flag management table is normally "ON" when the server is linked to or from other load distribution servers. However, as for the load distribution server that joins first, the link completion flag in the flag management table is switched to "ON" even if the first registered load distribution server is not linked to or from any other load distribution server, so as to indicate that the server is prepared to accept links from servers to join later.

In the load distribution server A200, the flag managing unit 210 then changes its flag to a dummy ON state (a state where the server is prepared to accept links from other load distribution servers, but the number of links is one and has not reached two yet) (step A19 of FIG. 2).

If the determination result of step A2 of FIG. 2 is "NO", the directory server accessing unit of the load distribution server acquires all the sets of the information including the server names, the link completion flags, and the IP addresses, which are the information about the load distribution servers registered in the flag management table of the directory server 100 (step A3 of FIG. 2).

The load accommodation link managing unit of the load distribution server then randomly selects a set of information about a load distribution server having the link completion flag set at "ON" and the specified value flag not checked, from the sets of information acquired at step A3. Using the information about the IP address in the set of information, the load accommodation link managing unit requests a load accommodation link to the load distribution server having the link completion flag set at "ON" and the specified value flag not checked (step A4 of FIG. 2). Specifically, at step A4, a load distribution server that is prepared to accept links but does not have the specified number of links yet (the maximum number of links in this embodiment is four) is selected, and a request for a link to the load distribution server is issued.

The load accommodation link managing unit of the load distribution server as the request issuer determines whether the load distribution server that has received the request for a load accommodation link already has the specified number of links (step A5 of FIG. 2). If the determination result of step A5 is "NO", the load accommodation link managing unit of the load distribution server that has issued the request for a load accommodation link puts a load accommodation link to the load distribution server that has received the request (step A6).

The load accommodation link managing unit of the load distribution server that has received the request and has the load accommodation link put thereto at step A6 stores a set of information about the load distribution server on the other end of the link into the load accommodation link managing unit (step A7 of FIG. 2), the set of information being the server name and IP address of the load distribution server that has put the load accommodation link, and the "IN" information indicating that the server has a passive link put thereto.

Further, the load accommodation link managing unit of the load distribution server that has issued the request for the load accommodation link stores a set of information about the load distribution server on the other end of the link into the load accommodation link managing unit (step A8 of FIG. 2), the set of information being the server name and ID address of the other end of the link (the load distribution server on the other end of the link), and the "OUT" information indicating that the server has an active link put thereto.

If the determination result of step A5 is "YES", the operation moves on to step A8 of FIG. 2.

The load accommodation link managing unit of the load distribution server determines whether the number of load accommodation links the load distribution server has actively (voluntarily) put has reached the specified value of 2 (the maximum active link number) (step A9 of FIG. 2).

If the determination result of step A9 is "NO", the load accommodation link managing unit of the load distribution server judges whether there is a load distribution server that has the link completion flag set at "ON" and a link completion flag not checked among the sets of information in the flag management table acquired at step A3 (step A10 of FIG. 2).

If the determination result of step A10 is "YES", the load accommodation link managing unit of the load distribution server again carries out step A4. If the determination result of step A9 is "YES" and the determination result of step A10 is "NO", the load accommodation link managing unit of the load distribution server moves on to step A11.

The load accommodation link managing unit of the load distribution server determines whether the load distribution server has successfully put two or more load accommodation links (step A11 of FIG. 2). If the determination result of step A11 is "YES", the load distribution server switches the flag that is held therein and indicates its state to "ON" (step A12 of FIG. 2). The "ON" flag indicates that the load distribution server is linked to two or more load distribution servers.

The directory server accessing unit of the load distribution server then sends its server name and IP address to the directory server 100, and issues a request to switch the link completion flag corresponding to the load distribution server in the flag management table to "ON" (step A13 of FIG. 2).

If the determination result of step A11 is "NO", the operation moves on to step A14. The load accommodation link managing unit of the load distribution server determines whether the load distribution server has put one or more load accommodation links (step A14 of FIG. 2).

If the determination result of step A14 is "YES", the directory server accessing unit of the load distribution server sends its server name and IP address to the directory server 100, and issues a request to switch the link completion flag corresponding to the server name and the IP address in the flag management table to "ON", and also switches the flag that is held therein to "dummy ON" (step A15 of FIG. 2).

The flag management table managing unit 110 of the directory server 100 changes the link completion flag in the flag management table to an ON state with respect to the load distribution server that has issued the request (step A16 of FIG. 2). If the determination result of step A14 is "NO", the operation moves onto step A17. The situation where the load distribution server cannot put one or more load accommodation links is normally observed only in the case of the directory server first registered in the directory server where the determination result of step A2 is "YES". Such a situation cannot be normally observed at step A17, and therefore, any processing is not performed (step A17 of FIG. 2).

Figure 3:
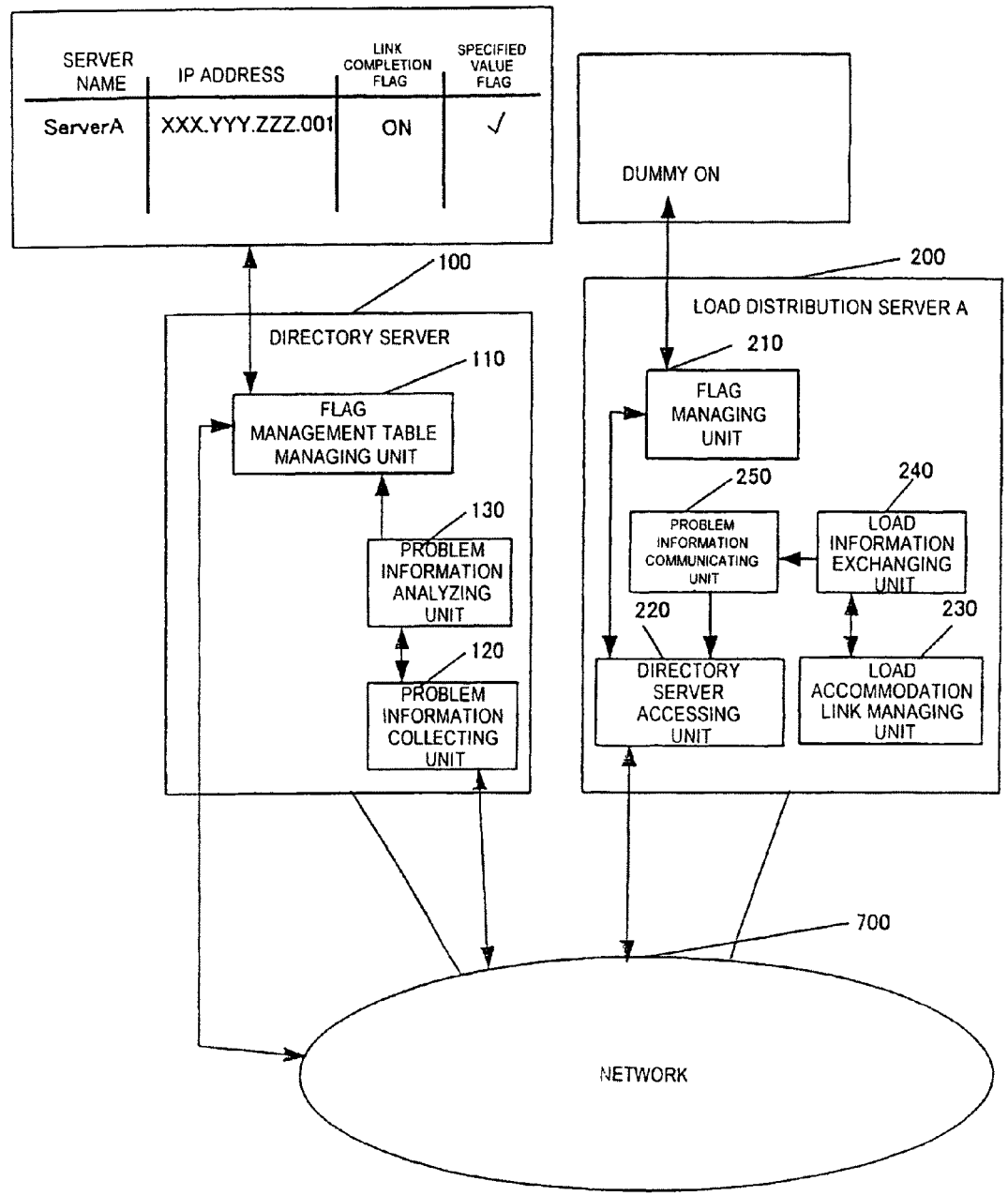
FIG. 3 is a block diagram showing a structure observed when a first load distribution server is added in the embodiment of the present invention.

FIG. 3 is a block diagram showing a situation where a load distribution server is first linked to the directory server 100 in this embodiment. Referring to FIG. 3, an example case where a load distribution server is first linked to the directory server 100 according to the flowchart of FIG. 2 is described.

First, the directory server accessing unit 220 of the load distribution server A (200 in FIG. 3) registers the server name ("Server A" in this example) of the server, the IP address (XXX.YYY.ZZZ.001) of the server, and a link completion flag set at "OFF" in the flag management table of the directory server (100 in FIG. 3).

Since the load distribution server A200 is the first server registered in the directory server 100, the directory server 100 returns a message to the load distribution server A200 to switch the flag to "dummy ON". The flag management table managing unit 110 of the directory server 100 changes the link completion flag on the row of Server A in the flag management table to "ON". In the load distribution server A200, the flag managing unit 210 changes the flag to "dummy ON". In this manner, the first distribution server A200 is registered in the directory server 100.

Figure 4:
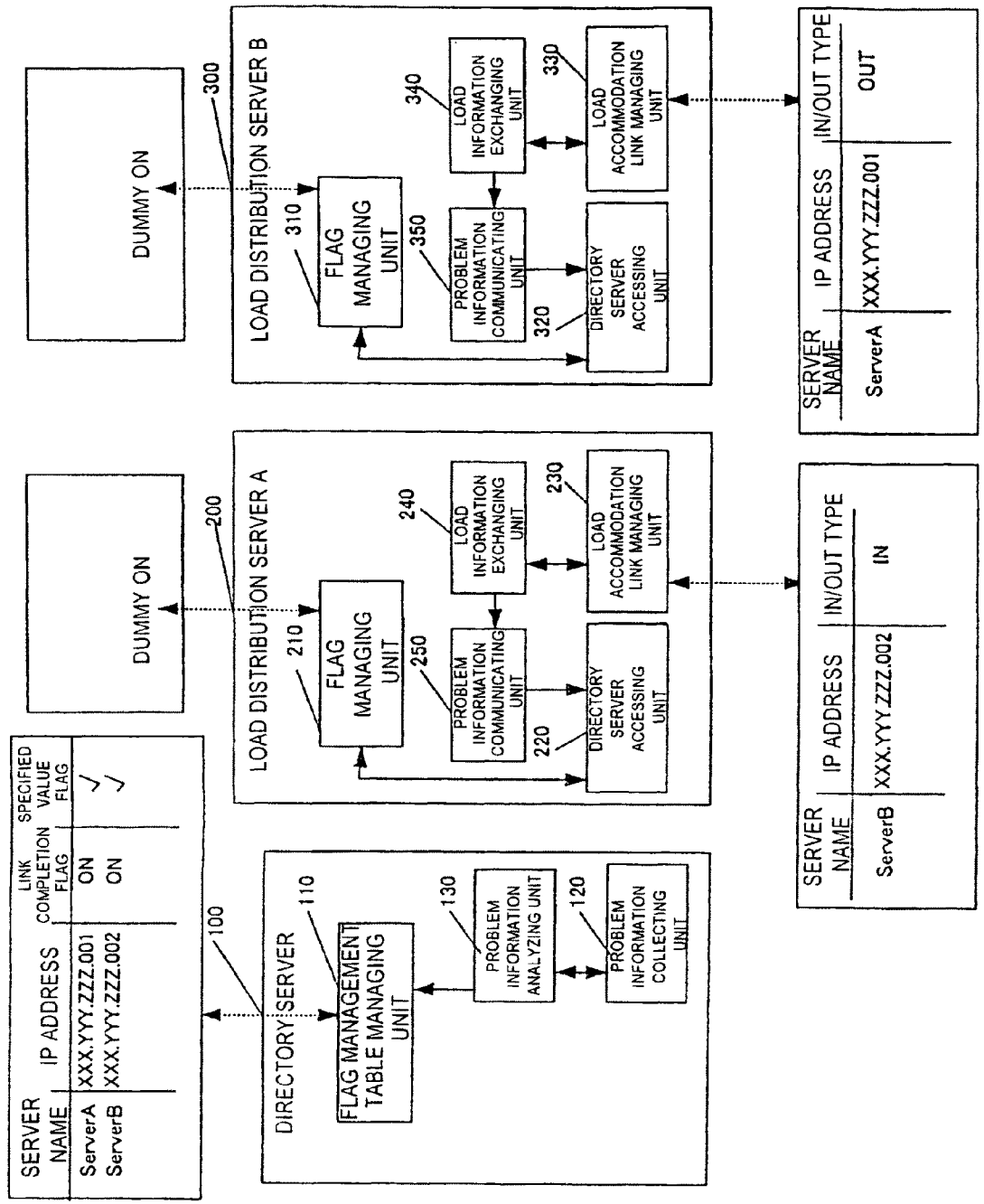
FIG. 4 is a block diagram showing a structure observed when a second load distribution server is added in the embodiment of the present invention.

FIG. 4 is a block diagram showing a situation where two load distribution servers are registered by adding another load distribution server after the first load distribution server is linked to the directory server 100 in this embodiment.

In the above described manner, the load distribution server A200 is already registered in the directory server 100. The load distribution server B (300 in FIG. 4) registers the server name ("Server B" in this example) of the server, the IP address (XXX.YYY.ZZZ.002) of the server, and a link completion flag set at "OFF" in the flag management table of the directory server 100.

The load distribution server B300 is not the first load distribution server registered in the directory server 100, and therefore, acquires the information registered in the flag management table of the directory server 100. At this point of acquirement, the link completion flag of Server B is "OFF".

Since Server A or the load distribution server A200 is the only one load distribution server that has the link completion flag set at "ON" and has not been checked, the load accommodation link managing unit 330 selects the load distribution server A200. The load accommodation link managing unit 330 then requests a load accommodation link to the load distribution server A200.

Since the number of links of the load distribution server A200 that has received the request for a load accommodation link is smaller than the specified maximum link number (four in this case), the load distribution server B300 as the request issuer puts a link to the load distribution server A200 that has received the link request.

The end that has put the link (the load distribution server B300) and the end that has the link put thereto (the load distribution server A200) each increment the number of its links by one.

The IN/OUT type in the table held and managed by the load accommodation link managing unit on the end that has puts a link or on the end that has actively puts a link is switched to "OUT". Since the load distribution server B300 puts a link to the load distribution server A200 in this case, the server name and IP address of the load distribution server A200 and "OUT" indicating that the link orientation is active are stored in the load accommodation link managing unit 330 of the load distribution server B300.

Since the load distribution server A200 has the link passively put thereto, the server name and IP address of the load distribution server B300 and "IN" indicating that the link orientation is passive are stored in the load accommodation link managing unit 230 of the load distribution server A200. In this case, the information indicating "Server B", "XXX.YYY.ZZZ.002", and "IN" is stored in the table held and managed by the load accommodation link managing unit 230.

Figure 5:
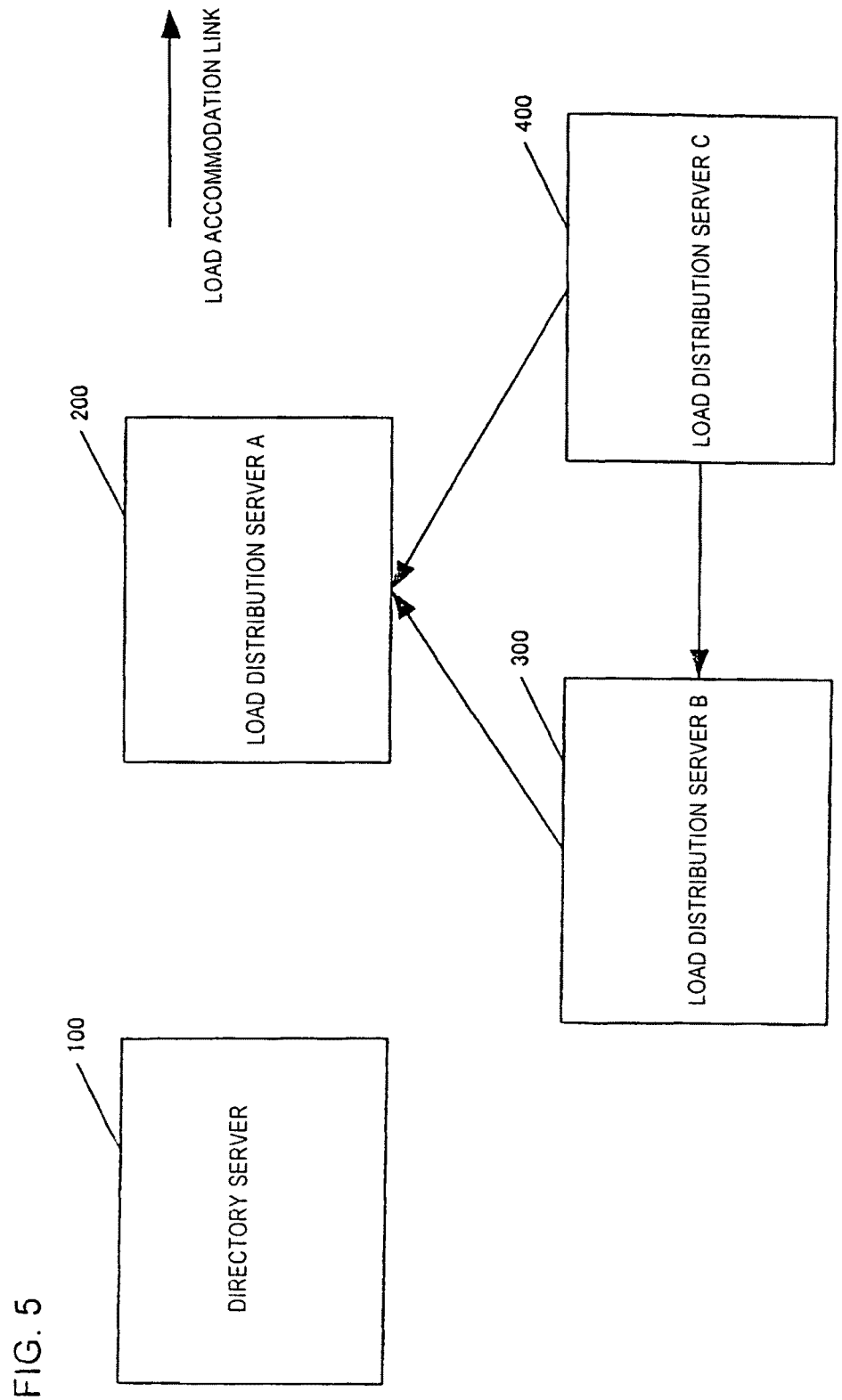
FIG. 5 is a block diagram showing a structure having load accommodation links among load distribution servers, as observed when a third load distribution server is added in the embodiment of the present invention.

Referring now to FIG. 5, an operation to be performed to add the load distribution server C (400 in FIG. 5) to the two load distribution servers of the load distribution server A (200 in FIG. 5) and the load distribution server B (300 in FIG. 5) is described.

In a situation prior to the addition of the load distribution server C400, the load distribution server B300 has put a link to the load distribution server A200, and the load accommodation link managing unit 330 of the load distribution server B300 holds the server name and IP address of the load distribution server A200, and the OUT information indicating the link orientation.

On the other hand, the load accommodation link managing unit 230 of the load distribution server A200 holds the server name and ID address of the load distribution server B300, and the IN information indicating the link orientation.

In FIG. 5, the load distribution server B300 from which an arrow extends holds the OUT information as well as the server name and IP address of the load distribution server A200 from which a link is put to the server B300. The load distribution server A200 to which the arrow extends holds the IN information as well as the server name and IP address of the server B300 on the other end of the link.

When the load distribution server C400 is newly added to the system in this situation, the load distribution server C400 registers its server name and IP address and a link completion flag set at "OFF" in the flag management table of the directory server 100. After that, the load distribution server C400 acquires, from the directory server 100, the information stored in the flag management table having the information about the server added thereto.

In the acquired information, the link completion flags in the information about the load distribution server A200 and the information about the load distribution server B300 are set at "ON". Accordingly, the load distribution server C400 puts a load accommodation link to the load distribution server A200 in the OUT direction with respect to the server C400, according to the flowchart of FIG. 2. The load distribution server C400 also puts a load accommodation link to the load distribution server B300 in the OUT direction with respect to the server C400.

Since the specified value for each load distribution server to actively form links (the maximum active link number) is two, no more links are to be formed. Also, since the load distribution server C400 has successfully put two or more links, the load accommodation link managing unit 430 of the load distribution server C400 switches the flag held therein to "ON". The directory server accessing unit 420 of the load distribution server C400 sends its server name and IP address to the directory server 100, and issues a request to switch the link completion flag corresponding to the server C400 in the flag management table in the directory server 100 to "ON". In accordance with the request, the flag management table managing unit 110 of the directory server 100 switches the link completion flag corresponding to the load distribution server C400 in the flag management table to "ON".

Figure 6:
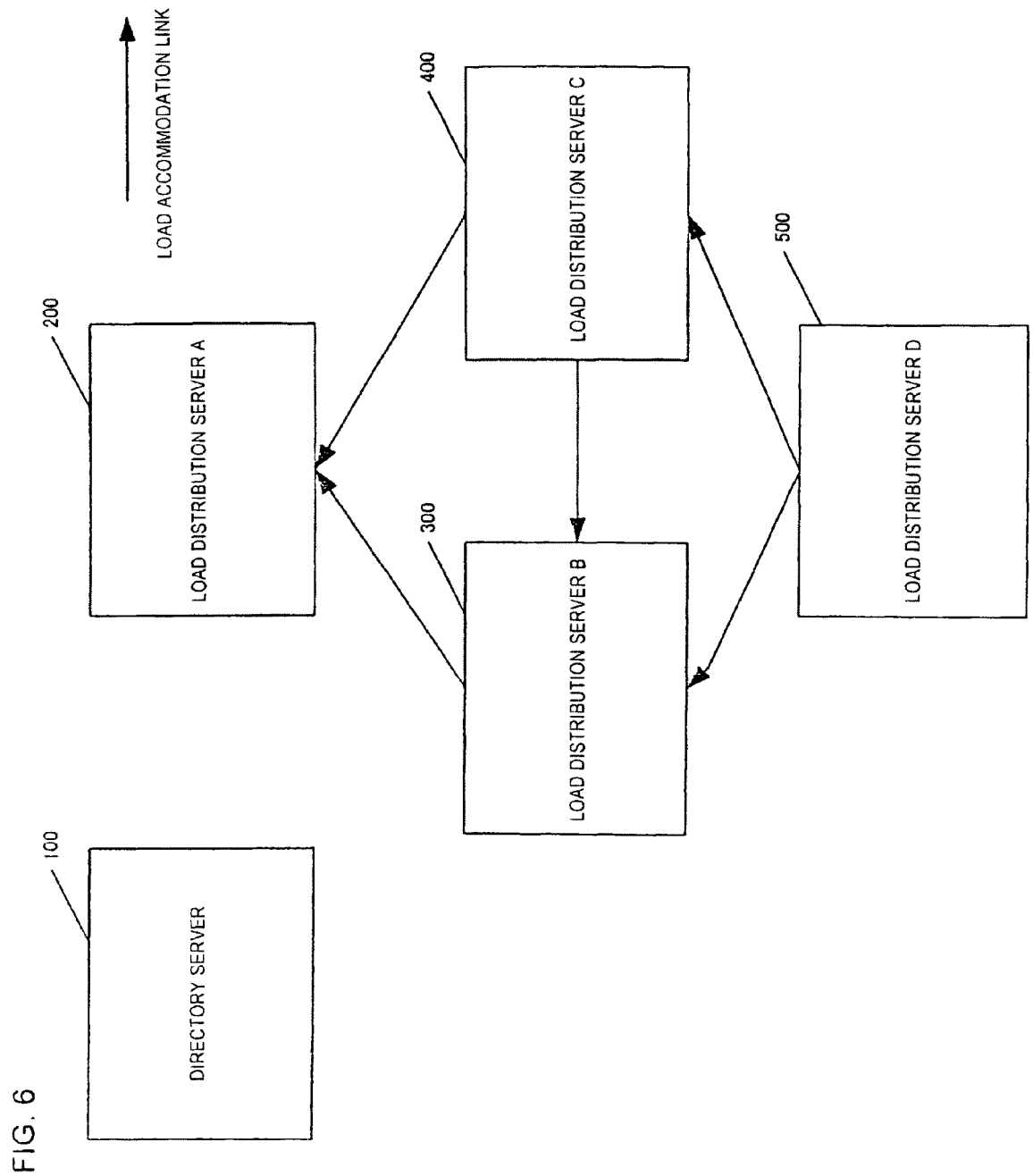
FIG. 6 is a block diagram showing a structure having load accommodation links among load distribution servers, as observed when a fourth load distribution server is added in the embodiment of the present invention.

Referring now to FIG. 6, an example case where the number of load distribution servers is increased from three to four is described. The situation where there are three load distribution servers is shown in FIG. 5.

When the load distribution server D (500 in FIG. 6) is added in this situation as the fourth load distribution server, the load distribution server D500 first registers its server name and IP address, and a link completion flag set at "OFF" in the directory server 100. After that, the load distribution server D500 acquires, from the directory server 100, the information stored in the flag management table having the information about the server D500 added thereto.

In the acquired information, the link completion flags in the information about the load distribution server A (200 in FIG. 6), the information about the load distribution server B (300 in FIG. 6), and the information about the load distribution server C (400 in FIG. 6) are set at "ON". Since the specified value for the load distribution server D500 to actively form links is two, the load distribution server D500 randomly selects two of the load distribution servers, and puts links to the two selected load distribution servers.

In this example case, it is assumed that the load distribution server D500 puts links to the load distribution server B300 and the load distribution server C400. The load accommodation link managing unit 530 in the load distribution server D500 stores the server names and IP addresses of the load distribution server B300 and the load distribution server C400, and "OUT" indicating that the link orientations are active.

The load accommodation link managing unit 330 in the load distribution server B300 stores the server names and IP addresses of the load distribution server C400 and the load distribution server D500, and the IN information indicating that the link orientations are passive, as well as the server name and IP address of the load distribution server A200, and the OUT information indicating that the link orientation is active.

The load accommodation link managing unit (430 in FIG. 1) in the load distribution server C400 stores the server name and IP address of the load distribution server D (500 in FIG. 6), and the IN information indicating the link orientation, as well as the server names and IP addresses of the load distribution server A (200 in FIG. 6) and the load distribution server B (300 in FIG. 6), and the OUT information indicating the link orientation.

The load distribution server D500 also sends its server name and IP address to the directory server 100, and issues a request to switch the link completion flag corresponding to the server D500 in the flag management table in the directory server 100 to "ON". In accordance with the request, the flag management table managing unit 110 of the directory server 100 switches the link completion flag corresponding to the load distribution server D500 in the flag management table to "ON".

Figure 7:
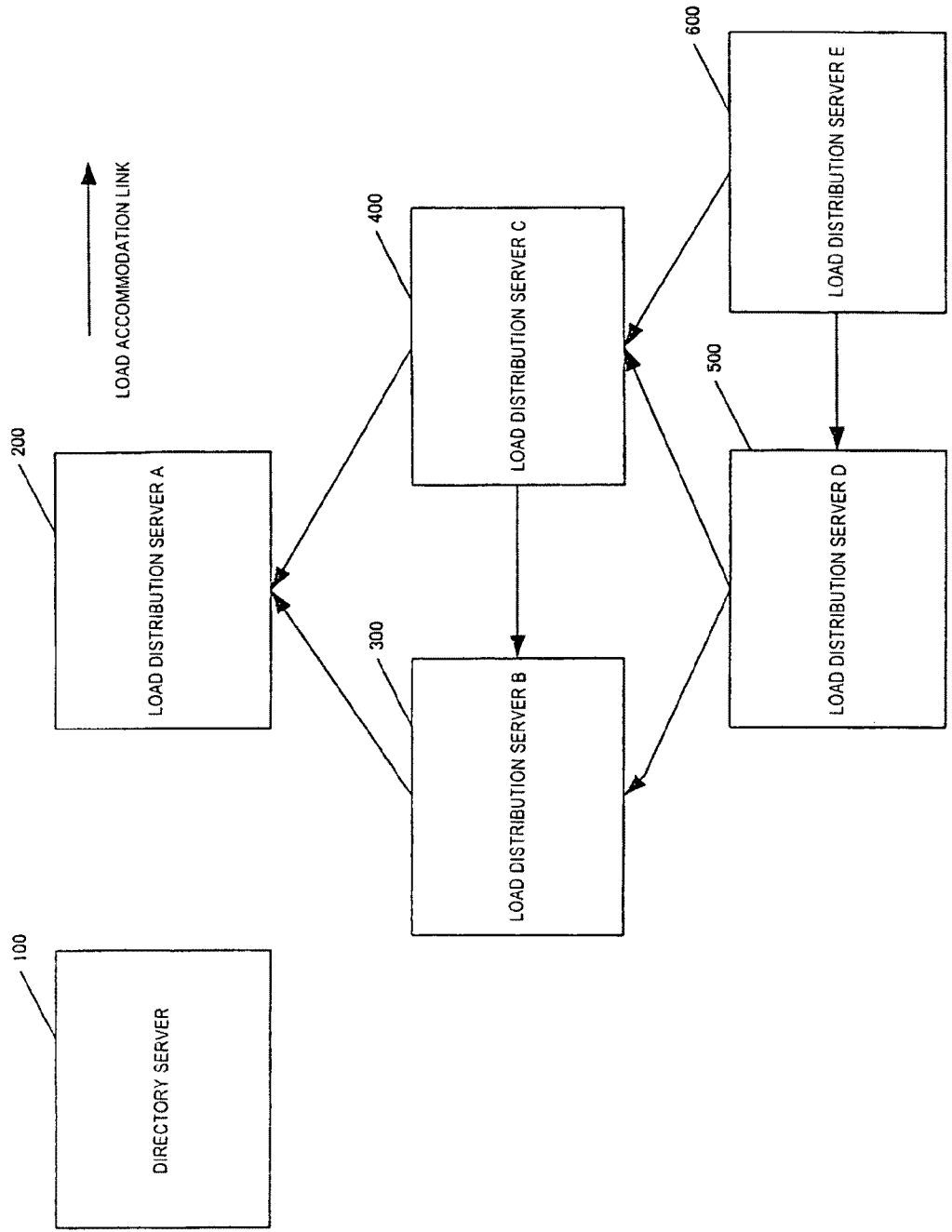
FIG. 7 is a block diagram showing a structure having load accommodation links among load distribution servers, as observed when a fifth load distribution server is added in the embodiment of the present invention.

Referring now to FIG. 7, an example case where the number of load distribution servers is increased from four to five is described.

When the addition of four load distribution servers to the system is completed, the situation illustrated in FIG. 6 is supposedly observed. In this situation, the load distribution server E (600 in FIG. 7) first registers its server name and IP address, and a link completion flag set at "OFF" in the directory server 100. After that, the load distribution server E600 acquires the information stored in the flag management table having the information about the server E600 added thereto, from the flag management table managing unit 110 of the directory server 100.

In the acquired information, the link completion flags in the information about the load distribution server A (200 in FIG. 7), the information about the load distribution server B (300 in FIG. 7), the information about the load distribution server C (400 in FIG. 7), and the information about the load distribution server D (500 in FIG. 7) are set at "ON". Since the specified value for the load distribution server E600 to actively form links is two, the load distribution server E600 randomly selects two of the load distribution servers, and puts links to the two selected load distribution servers.

In this example case, it is assumed that the load distribution server E600 puts links to the load distribution server C400 and the load distribution server D500. As a result, the load accommodation link managing unit 430 in the load distribution server C400 stores links having the OUT orientation as the link orientation with respect to the load distribution server B300 and the load distribution server A200 forming load accommodation links, and links having the IN orientation as the link orientation with respect to the load distribution server D500 and the load distribution server E600, as well as the server names and IP addresses.

With this arrangement, the links with the four load distribution servers A200 through D500 are stored in the load accommodation link managing unit 430.

The load accommodation link managing unit 530 of the load distribution server D500 stores links having the OUT orientation with respect to the load distribution server B300 and the load distribution server C400, and a link having the IN orientation with respect to the load distribution server E600, as well as the server names and IP addresses. Accordingly, the load accommodation link managing unit 530 stores the links with the three servers.

The load accommodation link managing unit 630 of the load distribution server E600 stores links having the OUT orientation with respect to the load distribution server C400 and the load distribution server D500, and holds the information about the links as well as the server names and the IP addresses. Accordingly, the load distribution server E600 has two links. After that, the load distribution server E600 sends its server name and IP address to the directory server 100, and issues a request to switch the link completion flag corresponding to the server E600 in the flag management table of the directory server 100 to "ON".

In accordance with the request, the flag management table managing unit 110 of the directory server 100 switches the link completion flag corresponding to the load distribution server E600 in the flag management table to "ON". In this manner, the load distribution servers A200 and E600 each having two links, the load distribution servers B300 and D500 each having three links, and the load distribution server C400 having four links are established.

Six or more load distribution servers may be arbitrarily added according to the flowchart of FIG. 2, with four being the maximum link number as the specified value indicating the maximum number of load accommodation links a load distribution server can have (see step A5 of FIG. 2), and two being the maximum active link number as the specified value indicating the maximum number of active load accommodation links a load distribution server can form (see step A9 of FIG. 2).

By this configuration method, when the situation illustrated in FIG. 7 is established, each of the servers holds two or more server names, two or more IP addresses, and two or more pieces of IN/OUT information in the load accommodation link managing unit. Accordingly, even if one of the load distribution servers breaks down due to a problem or the like, the other link remains linked to or from another distribution server, and connectivity can be maintained despite the single problem.

Where the number of load distribution servers is N (a positive integer), the total number of load accommodation links is 2N−3.

Figure 8:
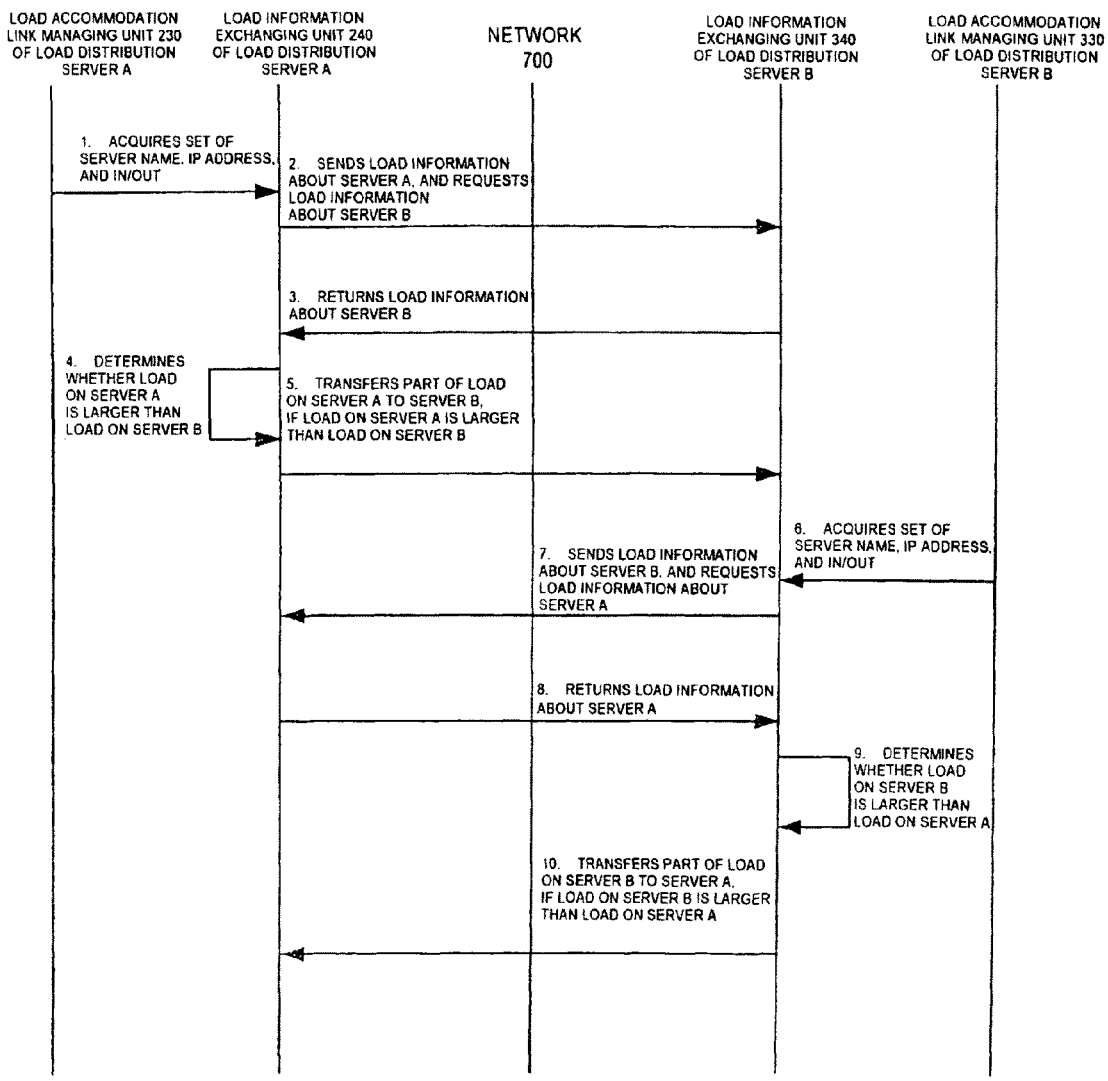
FIG. 8 is a message sequence chart showing the procedures for performing load accommodation among the load distribution servers in the embodiment of the present invention.

Referring now to the block diagram of FIG. 4 and the message sequence chart of FIG. 8, a method for distributing loads among load distribution servers is described.

In FIG. 4, the load distribution server A (200 in FIG. 4) stores the server name, IP address, and IN/OUT type of the other end of a link in the load accommodation link managing unit (230 in FIG. 4). Here, the server name "Server B", the IP address "XXX.YYY.ZZZ.002", and "IN" as the IN/OUT type are stored.

In procedure 1 of FIG. 8, the load accommodation link managing unit 230 of the load distribution server A200 sends the information about the set of the server name, IP address, and IN/OUT type to the load information exchanging unit 240 of the load distribution server A200.

In procedure 2 of FIG. 8, the load information exchanging unit 240 of the load distribution server A200 sends the load information about the load distribution server A200 to the load information exchanging unit 340 of the load distribution server B300 via the network 700, and requests the load information about the load distribution server B300.

In procedure 3 of FIG. 8, the load information exchanging unit 340 of the load distribution server B300 returns the load information about the server B300 to the load information exchanging unit 240 of the load distribution server A200.

In procedure 4 of FIG. 8, the load information exchanging unit 240 of the load distribution server A200 determines whether the load on the load distribution server A200 is larger than the load on the load distribution server B300.

If the load on the load distribution server A200 is larger than the load on the load distribution server B300, the load information exchanging unit 240 of the load distribution server A200 transfers part of the load on the load distribution server A200 to the load distribution server B300 via the network 700 in procedure 5 of FIG. 8. In this case, the load on the load distribution server B300 should not become larger than the load on the load distribution server A200.

In procedure 6 of FIG. 8, the load accommodation link managing unit 330 of the load distribution server B300 sends the information about the set of the server name, IP address, and IN/OUT type to the load information exchanging unit 340 of the load distribution server B300.

In procedure 7 of FIG. 8, the load information exchanging unit 340 of the load distribution server B300 sends the load information about the load distribution server B300 to the load information exchanging unit 240 of the load distribution server A200 via the network 700, and requests the load information about the load distribution server A200.

In procedure 8 of FIG. 8, the load information exchanging unit 240 of the load distribution server A200 returns the load information about the server A200 to the load information exchanging unit 340 of the load distribution server B300.

In procedure 9 of FIG. 8, the load information exchanging unit 340 of the load distribution server B300 determines whether the load on the load distribution server B300 is larger than the load on the load distribution server A200.

If the load on the load distribution server B300 is larger than the load on the load distribution server A200, the load information exchanging unit 340 of the load distribution server B300 transfers part of the load on the load distribution server B300 to the load distribution server A200 via the network 700 in procedure 10 of FIG. 8, so that the load distribution server A200 processes the part of the load on the load distribution server B300.

By carrying out the procedures 1 through 10 at regular intervals, the loads among the load distribution servers can be equalized.

Figure 9:
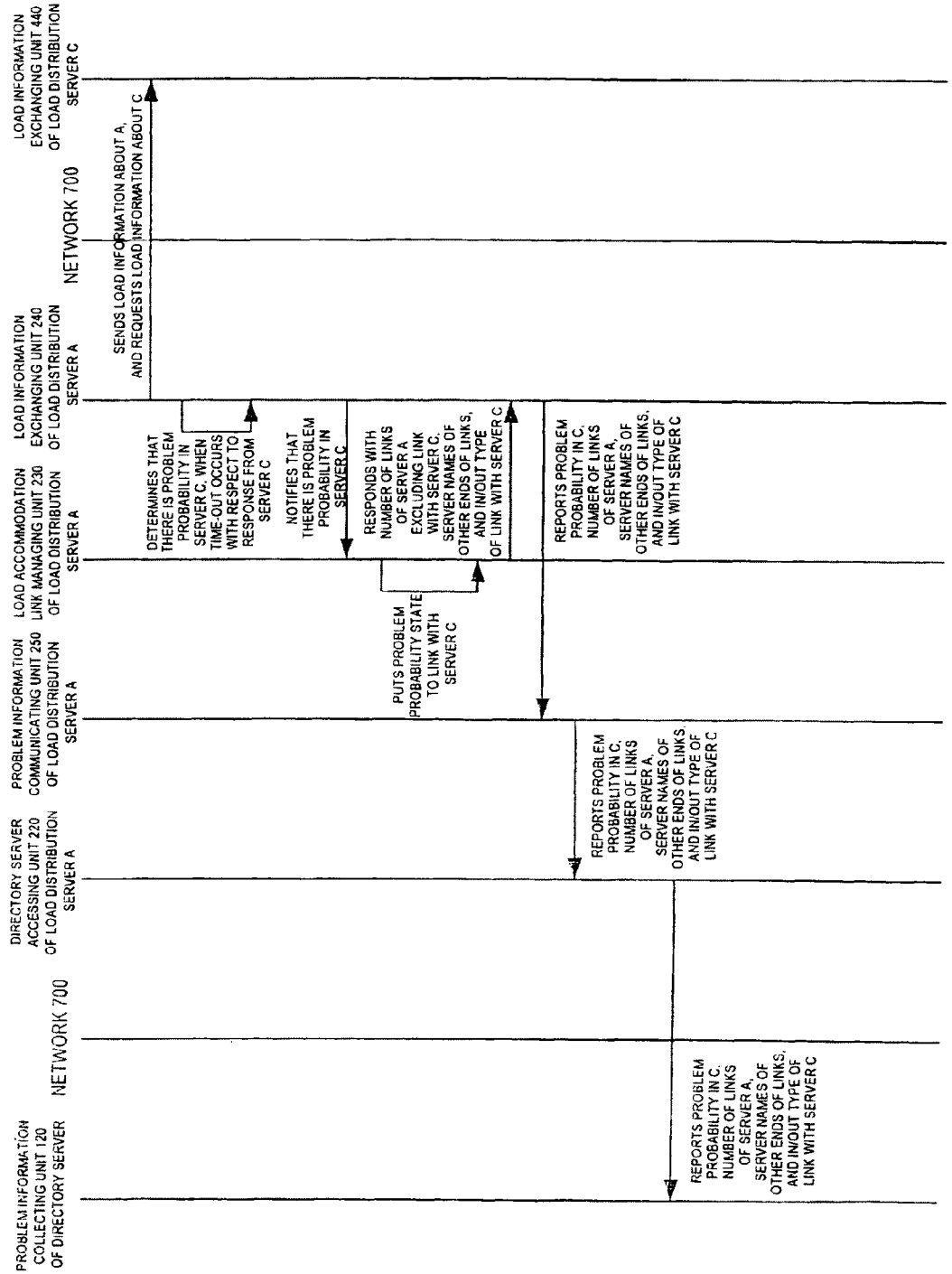
FIG. 9 is a message sequence chart showing the procedures for notifying the directory server that a problem is caused in a load distribution server in the embodiment of the present invention.

Referring now to the message sequence chart of FIG. 9, a method for finding a problem in a load distribution server and reporting the problem information to the directory server 100 is described. In the following example case, there is a load accommodation link between the load distribution server A200 and the load distribution server C400, and the load distribution server A200 uses the load accommodation link to find a problem in the load distribution server C400.

First, the load information exchanging unit 240 of the load distribution server A200 sends the load information about the load distribution server A200 to the load information exchanging unit 440 of the load distribution server C400, and requests the load information about the load distribution server C400.

If a time-out occurs as a response is not returned from the load information exchanging unit 440 of the load distribution server C400 over a predetermined period of time, the load information exchanging unit 240 of the load distribution server A200 determines that a problem might have been caused in the load distribution server C400.

The load information exchanging unit 240 of the load distribution server A200 then notifies the load accommodation link managing unit 230 of the load distribution server A200 that the load distribution server C400 might have a problem.

The load accommodation link managing unit 230 of the load distribution server A200 determines that the load distribution server C400 is in a state with a possible problem. The information about the possible problem in the load distribution server C400 may be added to and held in a linked-server table held by the load accommodation link managing unit 230.

In response to the problem probability notification from the load information exchanging unit 240, the load accommodation link managing unit 230 of the load distribution server A200 then reports the number of links of the server A200 excluding the link from the server C400, the server names of the other ends of the links, and the link type indicating whether the link with the server C400 is of the IN type or the OUT type, to the load information exchanging unit 240 of the load distribution server A200.

The load information exchanging unit 240 of the load distribution server A200 then reports the problem probability in the load distribution server C400, the number of links of the server A200 excluding the link from the server C400, the server names of the other ends of links, and the link type with respect to the server C400, to the problem information communicating unit 250 of the load distribution server A200.

The problem information communicating unit 250 of the load distribution server A200 then notifies the directory server accessing unit 220 in the load distribution server A of the problem probability in the load distribution server C400, the number of links of the server A200 excluding the link from the server C400, the server names of the other ends of the links, and the link type indicating whether the link with the server C400 is of the IN type or the OUT type.

The directory server accessing unit 220 of the load distribution server A200 then notifies the problem information collecting unit 120 of the directory server 100, via the network 700, of the problem probability in the load distribution server C400, the number of links of the server A200 excluding the link from the server C400, the server names of the other ends of the links, and the link type indicating whether the link with the server C400 is of the IN type or the OUT type. The problem information collecting unit 120 of the directory server 100 collects the problem information from each server.

The method for reporting the problem information to the directory server 100 has been described with reference to FIG. 9. Referring now to the flowcharts of FIGS. 10 through 12, operations to be performed to determine the problem probability based on the contents of the report, and eliminate the problem by putting a load accommodation link to a server adjacent to the problematic server or the like are described.

Figure 10:
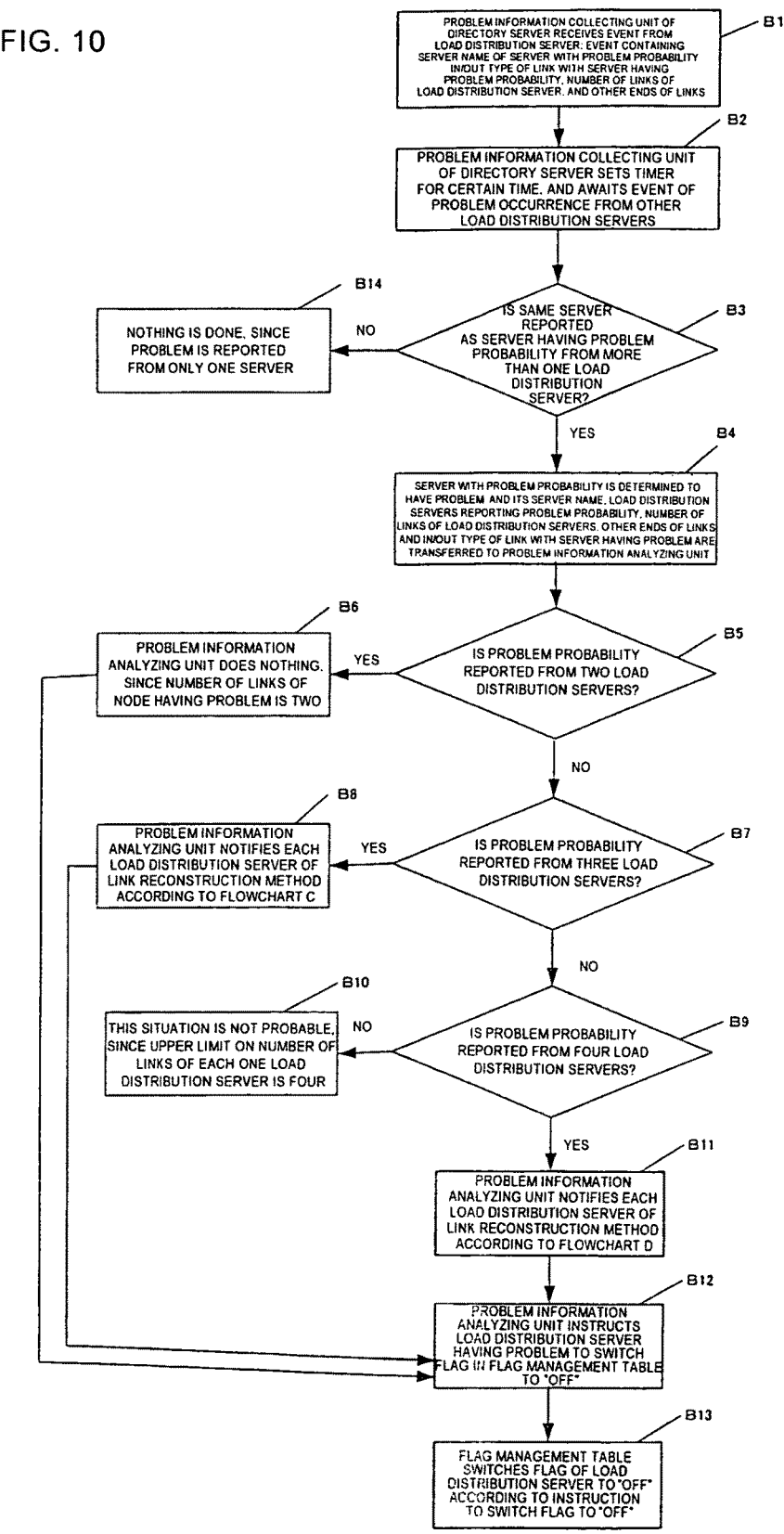
FIG. 10 is a flowchart showing the procedures in an operation to be performed when the directory server receives a report of a problem in the embodiment of the present invention.

Referring first to the flowchart of FIG. 10, the operation to be performed by the directory server 100 where a problem might have been caused in a load distribution server is described.

The problem information collecting unit 120 of the directory server 100 receives information as an event from one load distribution server (step B1 of FIG. 10). The information indicates the server name of a load distribution server having a problem probability, the type of link with the load distribution server, the number of links of the one load distribution server excluding the link with the load distribution server having the problem probability, and the other ends of the links.

The problem information collecting unit 120 of the directory server 100 then sets a timer for a certain period of time, and awaits an event of a problem occurrence report from another load distribution server (step B2 of FIG. 10).

When the set time of the timer runs out, the problem information collecting unit 120 of the directory server 100 determines whether the same load distribution server is picked as a load distribution server having a problem probability in events from load distribution servers (step B3 of FIG. 10).

If the result of step B3 of FIG. 10 is "YES", the problem information collecting unit 120 of the directory server determines that a problem has been caused in the load distribution server having the problem probability, and sends the information indicating the server name of the load distribution server which has the problem, the server name of the load distribution server which sends the problem occurrence report, the number of links of the respective load distribution servers having reported the problem probability, the other ends of the links, and the IN/OUT type of the link with the server having the problem, to the problem information analyzing unit 130 (step B4 of FIG. 10).

If the problem information is received from two or more load distribution servers within a predetermined period of time, a problem is determined to have been caused. If the problem information is received from only one load distribution server, a problem is determined not to have occurred. The reason for this is that, when the links with the respective load distribution servers are completed, the number of links of each load distribution server is more than one. Therefore, when a problem is caused in a load distribution server, the problem information should normally be reported from the load distribution servers linked to or from the problematic load distribution server. When the problem information is reported from only one server, on the other hand, the problem is determined to be a problem such as a network problem that has been caused in somewhere other than in the load distribution servers.

The problem information analyzing unit 130 of the directory server 100 determines whether the information about a problem probability is reported from two load distribution servers (step B5 of FIG. 10). If the determination result of step B5 is "YES", the problem information analyzing unit 130 does not perform any processing, since the number of links of the node (a load distribution server) having the problem is two. After that, the operation moves on to step B12 of FIG. 10 (step B6 of FIG. 10).

If the result of step B5 of FIG. 10 is "NO", the problem information analyzing unit 130 of the directory server 100 determines whether the problem probability is reported from three load distribution servers (step B7 of FIG. 10). If the result of step B7 is "YES", the problem information analyzing unit 130 acquires a link re-forming method as an analysis result according to the later described flowchart C of FIG. 11, and notifies each load distribution server of the analysis result. After that, the operation moves on to step B12 of FIG. 10 (step B8 of FIG. 10).

If the result of step B7 of FIG. 10 is "NO", the problem information analyzing unit 130 determines whether the problem probability is reported from four load distribution servers (step B9 of FIG. 10). The determination result of step B9 of FIG. 10 cannot be "NO", since the upper limit of the number of links one load distribution server can have is four (step B10 of FIG. 10).

Figure 12:
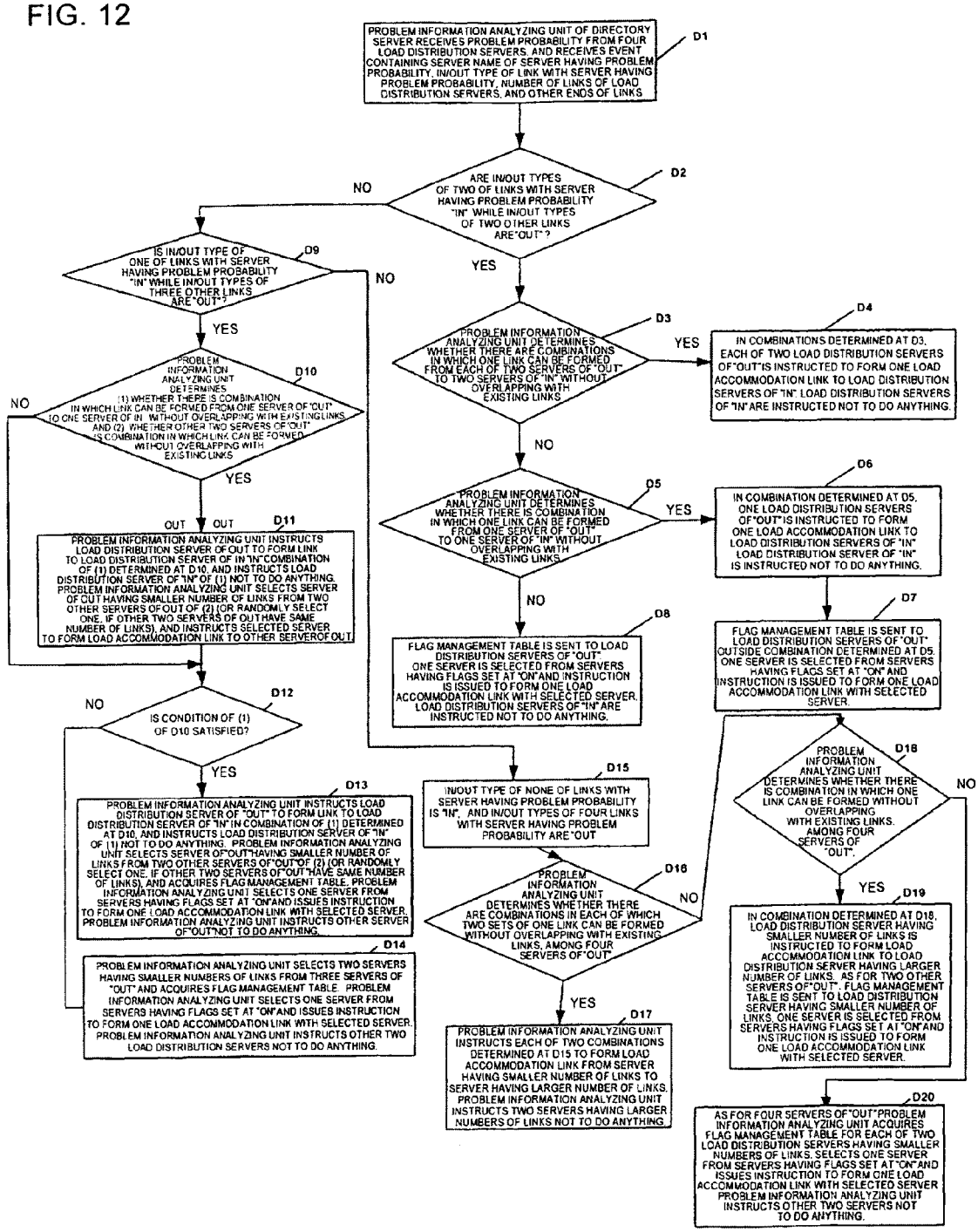
FIG. 12 is a flowchart showing the procedures in an operation to be performed when the directory server receives a report of a problem in the embodiment of the present invention, and is a flowchart branching from FIG. 10 when a problem probability is reported from four load distribution servers.

If the determination result of step B9 of FIG. 10 is "YES", the problem information analyzing unit 130 acquires a link re-forming method as an analysis result according to the flowchart D of FIG. 12, and notifies each load distribution server of the analysis result (step B11 of FIG. 10).

The problem information analyzing unit 130 then issues an instruction to switch the flag corresponding to the server name in the flag table to "OFF" with respect to the load distribution server determined to be problematic (step B12 of FIG. 10).

The flag management table managing unit 110 then switches the flag of the load distribution server to "OFF", in accordance with the instruction to switch the link completion flag in the flag management table to "OFF" (step B13 of FIG. 10). If the determination result of step B3 of FIG. 10 is "NO", the problem report is from only one server, and any processing is not performed, since there is a probability of a temporary network problem (step B14 of FIG. 10).

Figure 11:
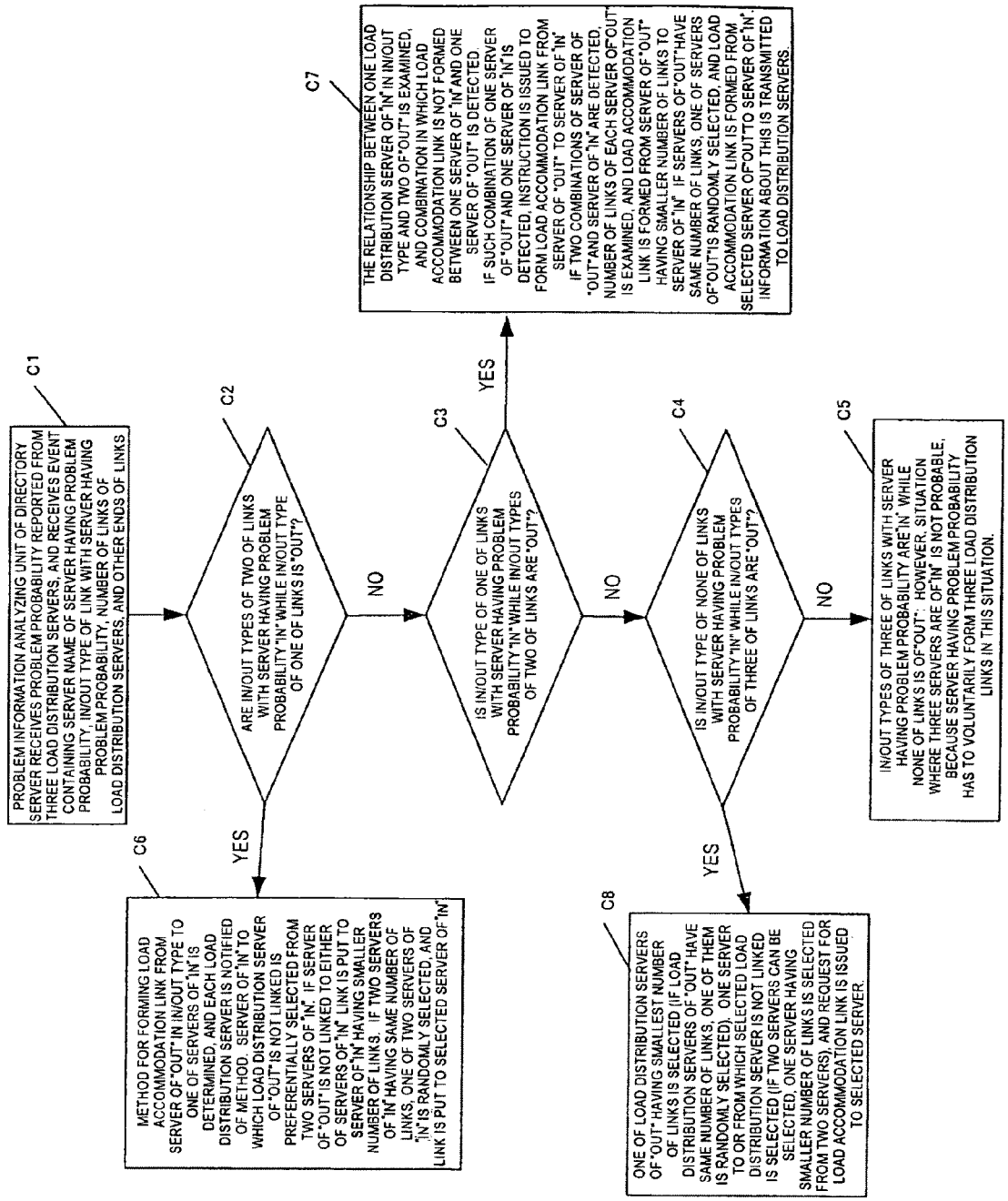
FIG. 11 is a flowchart showing the procedures in an operation to be performed when the directory server receives a report of a problem in the embodiment of the present invention, and is a flowchart branching from FIG. 10 when a problem probability is reported from three load distribution servers.

Referring now to the flowchart of FIG. 11, the procedure of step B8 of FIG. 10 is described. The procedure of step B8 relates to a method for recovering from a problem by re-forming part of a link when there is a problem probability in a load distribution server, and a problem in a load distribution server is reported from three load distribution servers.

When a problem probability is reported from three load distribution servers, the problem information analyzing unit 130 of the directory server 100 receives an event that indicates the server name of the load distribution server having the problem probability, the IN/OUT types with respect to the load distribution server (as described above, the link type is the OUT state where a load accommodation link is actively put to the load distribution server having the problem probability, and is the IN state where a load accommodation link is passively received from the server having the problem probability), the number of links of load distribution servers that have found the problem, and the other ends of the links of the load distribution servers that have found the problem (step C1 of FIG. 11).

The problem information analyzing unit 130 determines whether the link types (IN/OUT types) of two of the links with the load distribution server having the problem are "IN" while the link type of one of the links is "OUT" (step C2 of FIG. 11). If the result of step C2 of FIG. 11 is "NO", the problem information analyzing unit 130 of the directory server 100 determines whether the IN/OUT type of one of the links with the server having the problem is "IN" while the IN/OUT types of two of the links are "OUT" (step C3 of FIG. 11).

If the determination result of step C3 of FIG. 11 is "NO", the problem information analyzing unit 130 of the directory server 100 determines whether none of the links with the server having the problem is of the IN link type while the IN/OUT types of the three links are "OUT" (step C4 of FIG. 11). In other words, a check is made to determine whether the link types of the three links with the load distribution server having the problem occurrence probability are "IN" while none of the links is of the OUT type. There is a high probability that the load distribution server A200 that has first joined has such a combination of link types.

If the determination result of step C4 of FIG. 11 is "NO", the IN/OUT types of three of the links with the server having the problem probability are "IN" while none of the links is of the OUT type. However, where the IN/OUT types of three links are "IN", the load distribution server having the problem actively has three load accommodation links, and the number of active links exceeds the maximum active link number. Therefore, such a situation is not probable (step C5 of FIG. 11).

If the determination result of step C2 of FIG. 11 is "YES", the problem information analyzing unit 130 of the directory server 100 determines a method of putting a load accommodation link from the load distribution server of "OUT" in IN/OUT type to one of the load distribution servers of "IN", and notifies each distribution server of the method. The problem information analyzing unit 130 also carries out an analysis so that the remaining one load distribution server is also linked from another load distribution server, and instructs a load distribution server of the OUT link type to have a link to the remaining load distribution server.

In this case, the load distribution servers of the IN link type are instructed not to do anything (step C6 of FIG. 11).

In selecting a load distribution server at steps C6 through C8, a re-link structure is determined so that: (1) as a rule, the IN/OUT types are not changed before and after re-linking; (2) more than one link is not formed between each two load distribution servers; and (3) a link is preferentially put to the load distribution server having the smallest number of links. The priority order in the re-linking method is arbitrarily set.

The above aspect (1) is set to prevent link state degradation of each load distribution server in the entire computer system 1000 due to a change in link type at the time of re-linking, and allow proper re-linking when re-linking is performed next time. The above aspect (2) is set to maintain a linked state with other load distribution servers even when a problem is caused in one load distribution server. The above aspect (3) is set to establish a trouble-resistant structure by linking each of the load distribution servers to as many load distribution servers as possible.

For example, to select one load distribution server from two load distribution servers of the IN link type, the load distribution server to which the load distribution server of "OUT" is not linked should be preferentially selected, so as to avoid overlapping links. If the OUT load distribution server is not linked to either of the load distribution servers, the load distribution server of the IN link type having fewer links is selected. If the two IN load distribution servers have the same number of links, one of the two load distribution servers is randomly selected, and the load distribution server of the OUT link type is notified of the result. Here, the load distribution servers of the IN link type are instructed to do nothing (step C6 of FIG. 11).

If the determination result of step C3 of FIG. 11 is "YES", the problem information analyzing unit 130 of the directory server 100 examines the link relation between the single load distribution server of "IN" in IN/OUT type and the two load distribution servers of "OUT", and finds a combination of the single load distribution server of "IN" and one of the two load distribution servers of "OUT" between which a load accommodation link is not formed. If such a combination of one load distribution server of "OUT" and one load distribution server of "IN" is found, the problem information analyzing unit 130 instructs the load distribution server of "OUT" to put a load accommodation link to the load distribution server of "IN".

If such a combination is found with respect to two load distribution servers of "OUT" and a load distribution server of "IN", the number of links of each load distribution server of "OUT" is examined, and a load accommodation link from the load distribution server of "OUT" with fewer links is put to the load distribution server of "IN". If the two load distribution servers of "OUT" have the same number of links, one of the load distribution servers of "OUT" is randomly selected, and is instructed to actively put a load accommodation link to the load distribution server of "IN". As for the one remaining load distribution server, an analysis is also carried out so that the one remaining load distribution server is also linked to another load distribution server, and the load distribution server of the OUT link type is instructed to form a link. In this case, the load distribution server of the IN link type is instructed not to do anything (step C7 of FIG. 11).

If the determination result of step C4 of FIG. 11 is "YES", there are three load distribution servers of the OUT link type. In this case, the problem information analyzing unit 130 of the directory server 100 selects the one with the fewest links among the load distribution servers of the OUT link type. If the three load distribution servers of the OUT link type have the same number of links, the problem information analyzing unit 130 randomly selects a load distribution server, and puts a link to a load distribution server from and to which the randomly selected load distribution server is not linked. The link type of the load distribution server linked here is "IN".

In a case where two load distribution servers may be selected, a load accommodation link is put to the load distribution server with the fewer links between the two. The problem information analyzing unit 130 of the directory server instructs the originator of the load accommodation link to put the load accommodation link to a load distribution server at a link destination, and instructs the other load distribution servers not to do anything. As for the one remaining load distribution server, an analysis is carried out so that the one remaining load distribution server is also linked to another load distribution server, and the load distribution server of the OUT link type is instructed to form a link. In this case, the load distribution servers of the IN link type are instructed not to do anything (step C8 of FIG. 11).

Referring now to the flowchart of FIG. 12, a method for recovering from a problem when there is a problem probability in a load distribution server, and a problem in a load distribution server is reported from four load distribution servers is described.

When a problem probability is reported from four load distribution servers, the problem information analyzing unit 130 of the directory server 100 receives an event that indicates the server name of the load distribution server having the problem probability, the IN/OUT types with respect to the load distribution server (the link type is the OUT state where a load accommodation link is actively put to the load distribution server having the problem probability, and is the IN state where a load accommodation link is passively received from the server having the problem probability), the number of links of load distribution servers that have found the problem, and the other ends of the links of the load distribution servers that have found the problem (step D1 of FIG. 12).

The problem information analyzing unit 130 of the directory server 100 then determines whether the link types (IN/OUT types) of two of the links with the load distribution server with the problem probability are "IN" while the link types of two of the links are "OUT" (step D2 of FIG. 12).

If the determination result of step D2 of FIG. 12 is "YES", the problem information analyzing unit 130 of the directory server 100 determines whether there are combinations in which a link can be put to the two load distribution servers of the IN link type from each of the two load distribution servers of the OUT link type without any overlapping with the existing links (step D3 of FIG. 12). Normally, links can be formed through the procedure of step D3.

If the determination result of step D3 of FIG. 12 is "YES", the problem information analyzing unit 130 of the directory server 100 instructs each of the two load distribution servers of the OUT link type to put a load accommodation link to the load distribution servers of "IN" in the combinations determined at step D3 of FIG. 12. The load distribution servers of the IN link type are instructed not to do anything (step D4 of FIG. 12). The load distribution servers receiving the instruction perform only the processing to be performed when links are formed thereto.

If the determination result of step D3 of FIG. 12 is "NO", the problem information analyzing unit 130 of the directory server 100 determines whether there is a combination in which a link can be put to a load distribution server of the IN link type from a load distribution server of the OUT link type without any overlapping with the existing links (step D5 of FIG. 12).

If the determination result of step D5 of FIG. 12 is "YES", the problem information analyzing unit 130 of the directory server 100 instructs the load distribution server of the OUT link type to put a load accommodation link to the load distribution server of the IN link type in the combination determined at step D5 of FIG. 12. The load distribution server of the IN link type on the other end of the link is instructed not to do anything (step D6 of FIG. 12).

The problem information analyzing unit 130 of the directory server 100 then sends the flag management table managed by the flag management table managing unit 110 to the load distribution server of "OUT" outside the combination determined at step D5 of FIG. 12, instructs the load distribution server of the OUT link type to select a load distribution server that has a link completion flag set at "ON" and does not have any load distribution server linked thereto, and to put a load accommodation link to the selected server. (step D7 of FIG. 12).

If the determination result of step D5 of FIG. 12 is "NO", the problem information analyzing unit 130 of the directory server 100 sends the flag management table managed by the flag management table managing unit 110 to each of the two load distribution servers of the OUT link type, instructs each of the two load distribution servers of the OUT link type to select a load distribution server having a link completion flag set at "ON", and to put a load accommodation link to selected server, and instructs the load distribution servers of the IN link type not to do anything (step D8 of FIG. 12).

If the determination result of step D2 of FIG. 12 is "NO", a check is made to determine whether the link type of one of the links with the load distribution server with the problem probability is "IN" while the link types of the other three are "OUT" (step D9 of FIG. 12). If the determination result of step D9 of FIG. 12 is "YES", the problem information analyzing unit 130 of the directory server 100 determines (1) whether there is a combination in which a link can be put to the load distribution server of the IN link type from one of the load distribution servers of the OUT link type without any overlapping with the existing links, and (2) whether the link connecting the other two load distribution servers of the OUT link type (one of the two servers of the OUT link type turns into a server of the IN link type in this case) does not overlap with the existing links (step D10 of FIG. 12).

If the determination result of step D10 of FIG. 12 is "YES", the problem information analyzing unit 130 of the directory server 100 instructs the load distribution server of the OUT link type to put a load accommodation link to the load distribution server of the IN link type in the combination of (1) determined at step D10, and instructs the load distribution server on the IN side of (1) not to do anything. The load distribution server with the fewer links is maintained in the OUT state.

As for the two remaining load distribution servers of the OUT link type of (2) determined at step D10, the load distribution server with the fewer links is selected (if the two servers have the same number of links, one of the servers is randomly selected), the selected load distribution server of the OUT link type is instructed to put a load accommodation link to the other load distribution server of the OUT link type. The other load distribution server on the other end of the link is instructed not to do anything (step D11 of FIG. 12). In this case, the link type of the other load distribution server of the OUT link type is changed to the IN link type.

If the determination result of step D10 of FIG. 12 is "NO", a check is made to determine whether the conditions of (1) at step D10 of FIG. 12 are satisfied (step D12 of FIG. 12). If the determination result of step D12 of FIG. 12 is "YES", the load distribution server of the OUT link type is instructed to put a load accommodation link to the load distribution server of the IN link type in the combination of (1) determined at step D10, and the load distribution server on the IN side of (1) is instructed not to do anything.

The load distribution server with the fewer links is selected from the two remaining load distribution servers of the OUT link type of (2) (if the two servers have the same number of links, one of the servers is randomly selected). The flag management table managed by the flag management table managing unit 110 is sent to the selected load distribution server of the OUT type, and the selected load distribution server of the OUT type is instructed to put a load accommodation link to a load distribution server having a link completion flag set at "ON". The other load distribution server of the OUT link type is instructed not to do anything (step D13 of FIG. 12).

If the determination result of step D12 of FIG. 12 is "NO", the problem information analyzing unit 130 of the directory server 100 selects two load distribution servers with fewer links from the load distribution servers of the OUT link type (if those servers have the same number of links, two of the servers are randomly selected). The flag management table is sent to those selected load distribution servers, and each of the selected load distribution servers is instructed to put a load accommodation link to a load distribution server that does not have a link to or from anywhere and is selected from the load distribution servers each having a link completion flag set at "ON". The other two load distribution servers are instructed not to do anything (step D14 of FIG. 12).

If the determination result of step D9 of FIG. 12 is "NO", none of the links to the server with the problem probability is of the IN link type, and the IN/OUT types of the four links from the server with the problem probability are "OUT". Since the number of voluntary links is restricted to two in this embodiment, three or more links cannot have the IN link type, and this copes with the IN type (step D15 of FIG. 12).

The problem information analyzing unit 130 of the directory server determines whether there are combinations in each of which two sets of one link can be formed without any overlapping with the existing links, among the four load distribution servers of the OUT link type (step D16 of FIG. 12).

If the result of step D16 of FIG. 12 is "YES", the problem information analyzing unit 130 of the directory server 100 instructs each of the two combinations determined at step D15 to put a load accommodation link from the load distribution server with the fewer links to the load distribution server with the larger number of links. If the load distribution servers have the same number of links, load distribution servers are randomly selected and are notified. The two load distribution servers with the larger number of links are instructed not to do anything (step D17 of FIG. 12).

If the result of step D16 of FIG. 12 is "NO", the problem information analyzing unit 130 of the directory server 100 determines whether there is a combination in which one link can be formed without any overlapping with the existing links, among the four load distribution servers of the OUT link type (step D18 of FIG. 12).

If the determination result of step D18 of FIG. 12 is "YES", the problem information analyzing unit 130 of the directory server 100 instructs the combination determined at step D18 of FIG. 12 to put a load accommodation link from the load distribution server with the fewer links to the load distribution server with the larger number of links. If those load distribution servers have the same number of links, a load distribution server to put a link is randomly selected. The load distribution server with the larger number of links is instructed not to do anything.

As for the two remaining load distribution servers of the OUT link type, the flag management table is sent to the load distribution server with the fewer links (if those two servers have the same number of links, one of them is randomly selected). The load distribution server with the fewer links is instructed to put a link to a load distribution server that is selected from the load distribution servers each having a link completion flag set at "ON", excluding those already having links to or from somewhere (step D19 of FIG. 12). A warning may be issued to the remaining one load distribution server.

If the determination result of step D18 of FIG. 12 is "NO", the problem information analyzing unit 130 of the directory server selects the two load distribution servers with the fewer links from the four load distribution servers of the OUT link type. If those load distribution servers of the OUT link type have the same number of links, two of them are randomly selected. The flag management table is sent to each of the two load distribution servers, and each of the two load distribution servers is instructed to put a link to a load distribution server that is selected from the load distribution servers each having a flag set at "ON", excluding those already having links to or from somewhere. The other two load distribution servers are instructed not to do anything (step D20 of FIG. 12).

The above described embodiment includes: the load information exchanging unit that is capable of finding a problem in a load distribution server on the other end of a link by exchanging load information among load distribution servers on a regular basis; the problem information communicating unit that transmits the information about the problem to the directory server 100; the problem information collecting unit 120 that receives the information and transfers the information to the problem information analyzing unit; and the problem information analyzing unit 130 of the directory server 100. The problem information analyzing unit 130 determines that a load accommodation link is re-formed between load distribution servers, so that each load distribution server secures two or more links. With this structure, even if a problem is caused in a load distribution server, the connectivity among the load distribution servers is maintained, and there is no need to re-form load distribution servers. Accordingly, there is no degradation in response time for reading from and writing into each load distribution server.

Specifically, the information about problem occurrences can be gathered to the problem information analyzing unit 130 of the directory server 100, and the problem information analyzing unit 130 issues an instruction to form a new load accommodation link. Accordingly, each load distribution server can secure two or more links. Even if a problem is caused in a load distribution server, the connectivity among the load distribution servers is maintained, and there is no need to re-form load distribution servers. Accordingly, there is no degradation in response time for reading from and writing into each load distribution server.

When a problem is caused in a load distribution server, all the information about problems can be gathered to the problem information collecting unit 120 of the directory server 100, and the amount of information to be managed by each load distribution server can be reduced to the amount of information only about the servers connected to the load distribution server through links. Accordingly, the number of communications required when a problem is caused can be reduced.

As described above, as a link is locally re-formed between load distribution servers when a problem is caused in a load distribution server, there is no need to re-form the entire load distribution servers. Also, as each load distribution server manages only the information about the load distribution servers linked to or from the server, the management data and the amount of information communications are reduced.

When a problem is caused in a load distribution server, all the information about the problem can be gathered to the problem information collecting unit 120 of the directory server 100. Accordingly, each load distribution server only needs to hold the information about the load distribution servers linked to or from the server, and do not need to hold the information about the load distribution servers on the other ends of the links of the load distribution server linked to or from the server. With this arrangement, the amount of information to be managed by each load distribution server can be small.

The advantages of this embodiment are now described in greater detail. In this embodiment, predetermined conditions are set for each load distribution server to be added to the computer system 1000, so as to achieve the above described effects. Specifically, each load distribution server can be in an actively linked state in which the load distribution server is actively linked to another load distribution server, and in a passively linked state in which the load distribution server is passively linked from another load distribution server. The maximum active link number that is the upper limit value for the actively linked state is set (two in this embodiment), and the maximum link number that is the upper limit on the number of the links to and from other load distribution servers is also set (four in this embodiment). Each load distribution server is designed to be linked to and from other load distribution servers within the ranges of the maximum active link number and the maximum link number.

A problem caused in a load distribution server is found, as a load distribution server having a link of the IN link type or the OUT link type with the load distribution server with the problem exchanges load information on a regular basis, and a time-out occurs in the load information exchange.

All the information about the problem is then sent to the problem information collecting unit 120 of the directory server 100, and the problem information analyzing unit 130 of the directory server 100 re-forms a load accommodation link between the load distribution servers having a link with the load distribution server with the problem. In this manner, each load distribution server can secure two or more links. Even if a problem is caused in a load distribution server, the connectivity between the load distribution servers can be maintained. Also, even if load distribution servers are not re-formed, there is no degradation in response time for reading data from and writing data into each load distribution server.

Further, in this embodiment, when another problem is caused in a load distribution server, all the information about the problem can be gathered to the problem information collecting unit 120 of the directory server 100. Accordingly, each load distribution server needs to hold only the information about the load distribution servers having links to and from the server, and does not need to hold the information about the load distribution servers on the other ends of the links of the load distribution servers having links to and from the server. With this arrangement, each load distribution server needs to manage only a small amount of information, and the amount of information to be exchanged can be effectively reduced.

By the computer link method according to this embodiment, the response time is not degraded when a computer problem is caused in the computer system 1000 having computers cooperating with one another. Also, by the computer link method according to this embodiment, the amount of communications required to construct the computer system 1000 can be reduced.

Also, this embodiment can provide the computer system 1000 that is suitable for the computer link method.

This embodiment can further provide computers (the directory server and load distribution servers) suitable for constructing the computer system 1000.

This embodiment can also effectively provide a program to be suitably executed by a computer to construct the computers.

Although the computer system 1000 according to this embodiment has been described through an example of a load distribution system designed for distributing loads among load distribution servers cooperating with one another, this embodiment is not limited to that, and the computer system 1000 may be used as a computer system for constructing an inter-node network, for example.

EXAMPLES

Next, an operation in the best mode for carrying out the invention is described through specific examples. Particularly, a method for recovering from a problem in a load distribution server is described.

First, an example case where the number of links of a node having a problem is two or where the determination result of step B5 in the flowchart of FIG. 10 is "YES" is described.

First, the five load distribution servers A200 through E600 have linkage relations as shown in FIG. 7. A problem is then caused in the load distribution server E600, as indicated by the broken line in FIG. 13.

In this case, according to the processing method illustrated in FIG. 9, a problem probability in the load distribution server E600, the number of links (three) of the load distribution server excluding the link from the load distribution server E600, the server names of the load distribution server A200, the load distribution server B300, and the load distribution server D500 on the other ends of the links, and the link type "IN" with respect to the load distribution server E600 are sent from the load distribution server C400 to the problem information collecting unit 120 of the directory server 100.

Also, the probability of a problem in the load distribution server E600, the number of links (two) of the load distribution server excluding the link from the load distribution server E600, the server names of the load distribution server B300 and the load distribution server C400 on the other ends of the links, and the link type "IN" with respect to the load distribution server E are sent from the load distribution server D500 to the problem information collecting unit 120 of the directory server 100. Since the problem probability is reported from the two load distribution servers C400 and D500, the server with the problem probability is determined to be problematic at step B4 of the flowchart of FIG. 10, and each of the load distribution servers having reported the problem probability, the number of links of each of the load distribution servers having reported the problem probability, the other ends of the links, and the IN/OUT type with respect to the server (the load distribution server E600 in this case) determined to be problematic are transmitted to the problem information analyzing unit 130.

Figure 13:
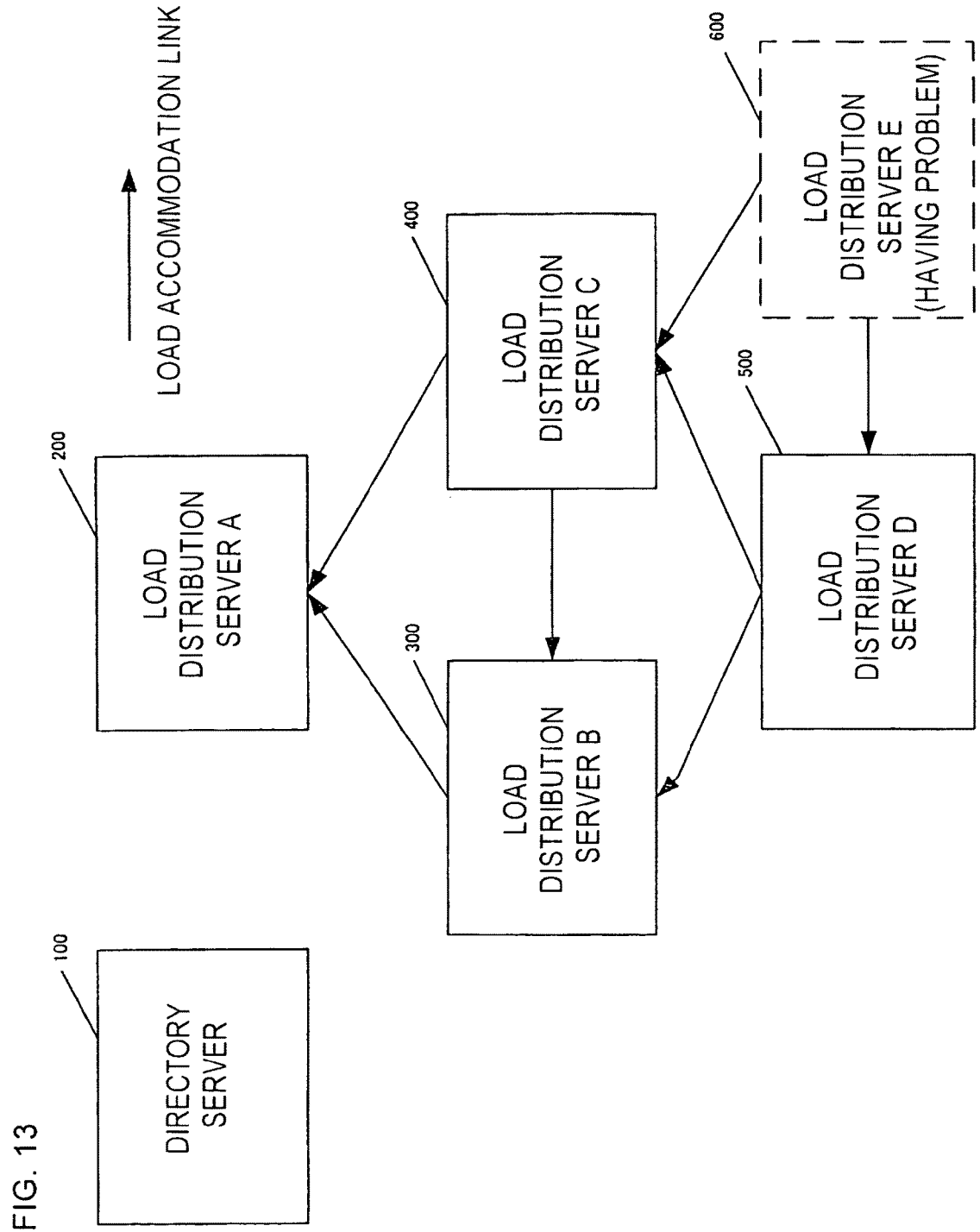
FIG. 13 is a block diagram showing an example case where a problem probability is reported from two load distribution servers.

In this case, a problem is caused in the load distribution server E600, as shown in FIG. 13. The problem information analyzing unit 130 then carries out the procedure of B6 of the flowchart of FIG. 10, or carries out nothing. However, the problem information analyzing unit 130 only notifies the load distribution server C400 and the load distribution server D500 that the problem in the load distribution server E600 has been confirmed. The load accommodation link managing unit 430 of the load distribution server C400 deletes the row corresponding to the load distribution server E600 from the table (see FIG. 4).

The load accommodation link managing unit 530 of the load distribution server D500 deletes the row corresponding to the load distribution server E600 from the table. After that, according to B12 of the flowchart of FIG. 10, the problem information analyzing unit 130 issues an instruction to switch the link completion flag in the flag management table to "OFF" with respect to the load distribution server E600 determined to be problematic. The flag management table managing unit 110 that manages the flag management table switches the flag of the load distribution server E600 to "OFF", in accordance with the instruction to switch the link completion flag to "OFF". At this point, the operation to recover from a problem comes to an end, and the situation turns into that illustrated in FIG. 6.

Next, an operation to recover from a problem in an example case where the number of links of a node (a load distribution server) having the problem is three or where the determination result of step B7 of the flowchart of FIG. 10 is "YES" is described.

Figure 14:
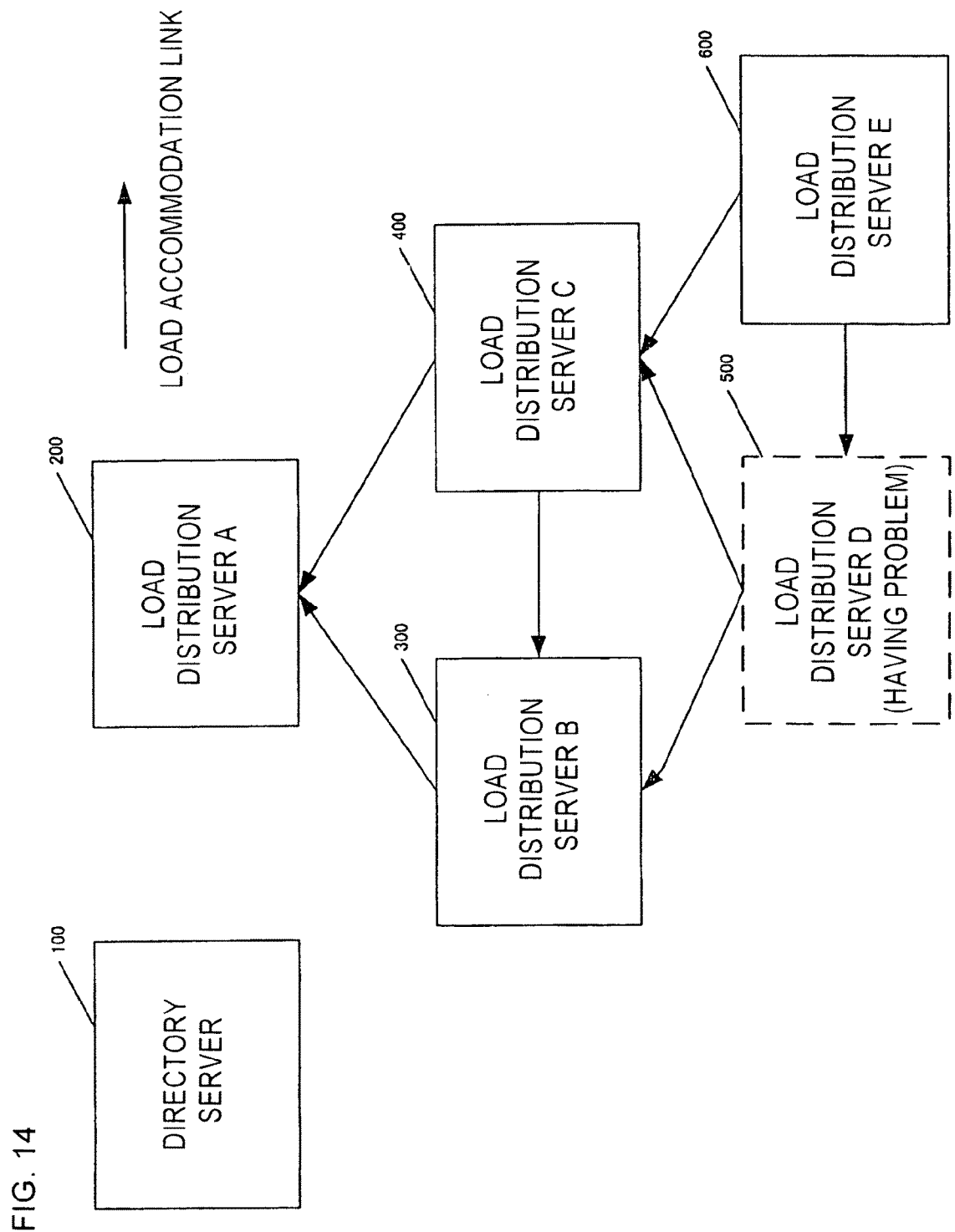
FIG. 14 is a block diagram showing an example case where a problem probability is reported from three load distribution servers.

This case is equivalent to a case where the situation illustrated in FIG. 7 turns into a situation in which a problem is caused in the load distribution server D500 as indicated by the broken line in FIG. 14.

At step B4 of the flowchart of FIG. 10, the load distribution server D500 having a problem probability is determined to be problematic. First, as for the load distribution server B300 among the three servers having reported the problem probability, the information indicating the number of links (two), the server names of the load distribution server A200 and the load distribution server C400 on the other ends of the links, and "IN" as the IN/OUT type with respect to the load distribution server having the problem is sent to the problem information analyzing unit 130. As for the load distribution server C400, the information indicating the number of links (three), the server names of the load distribution server A 200, the load distribution server B300, and the load distribution server E600 on the other ends of the links, and "IN" as the IN/OUT type with respect to the load distribution server D500 having the problem is sent to the problem information analyzing unit 130. Lastly, as for the load distribution server E600, the information indicating the number of links (one), the server name of the load distribution server C400 on the other end of the link, and "OUT" as the IN/OUT type with respect to the load distribution server D500 having the problem is sent to the problem information analyzing unit 130.

When the determination at step C2 of the flowchart of FIG. 11 is performed, the determination result becomes "YES", since the IN/OUT types of two of the links with the server having the problem probability are "IN" while the IN/OUT type of one of the links is "OUT". According to step C6 of the flowchart of FIG. 11, a load distribution server not having a load distribution server of "OUT" linked thereto has the higher priority level between the load distribution servers of "IN" in IN/OUT type. The load distribution server C400 already has the load distribution server E600 linked thereto, but the load distribution server B300 does not have the load distribution server E600 linked thereto. Accordingly, the load distribution server E600 of "OUT" in OUT/IN type is instructed to put a link from the load distribution server E600 to the load distribution server B300.

Figure 15:
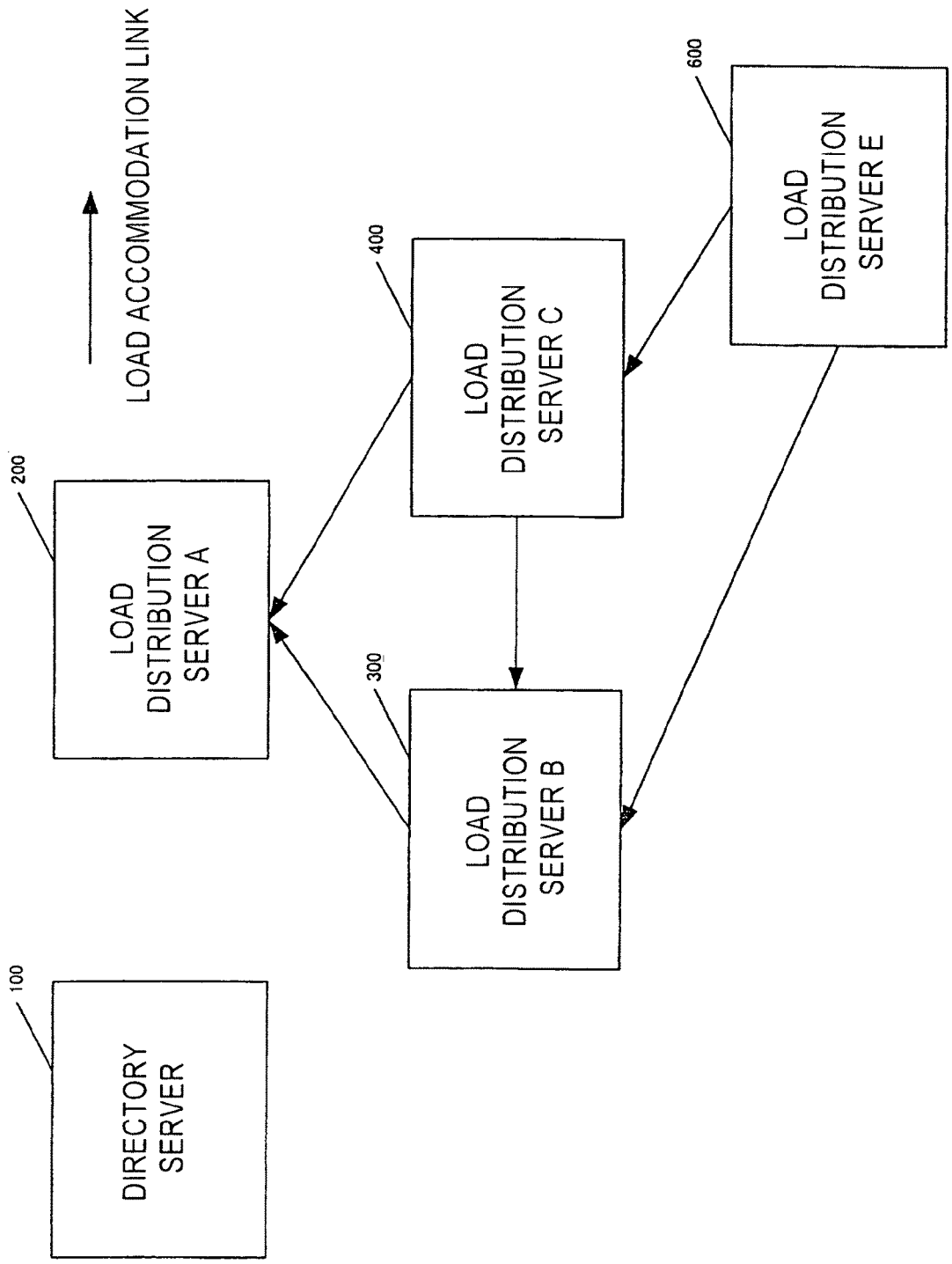
FIG. 15 is a block diagram that shows an example case where a problem probability is reported from three load distribution servers, and also shows the relations among the load accommodation links after a recovery from the problem.

A link from the load distribution server E600 is then put to the load distribution server B300, and the situation turns into that illustrated in FIG. 15. The load accommodation link managing unit 630 of the load distribution server E600 adds the information indicating the server name and IP address of the load distribution server B300, and "OUT" as the IN/OUT type to the table in the load accommodation link managing unit 630. The load accommodation link managing unit 330 of the load distribution server B300 adds the information indicating the server name and IP address of the load distribution server E600, and "IN" as the IN/OUT type to the table in the load accommodation link managing unit 330.

The problem information analyzing unit 130 of the directory server 100 notifies the load distribution server B300, the load distribution server C400, and the load distribution server E600 that the problem in the load distribution server D500 has been confirmed. Each corresponding load accommodation link managing unit deletes the row related to the load distribution server D500 from each corresponding table. After that, according to B12 of the flowchart of FIG. 10, the problem information analyzing unit 130 instructs the flag management table managing unit 110 to switch the link completion flag in the flag management table to "OFF" with respect to the load distribution server D500 determined to be problematic.

In response to the instruction, the flag management table managing unit 110 switches the link completion flag of the load distribution server D500 to "OFF", according to the instruction to switch the link completion flag in the flag management table to "OFF". At this point, the operation to recover from a problem comes to an end, and the situation turns into that illustrated in FIG. 15. Although the number of links of the load distribution server E600 temporarily becomes one, it becomes two after a recovery. Accordingly, even if a problem is caused in a load distribution server, the connectivity among the load distribution servers can be maintained.

Next, an example case where the number of links of a node having a problem is four or where the determination result of step B9 of the flowchart of FIG. 10 is "YES" is described.

Figure 16:
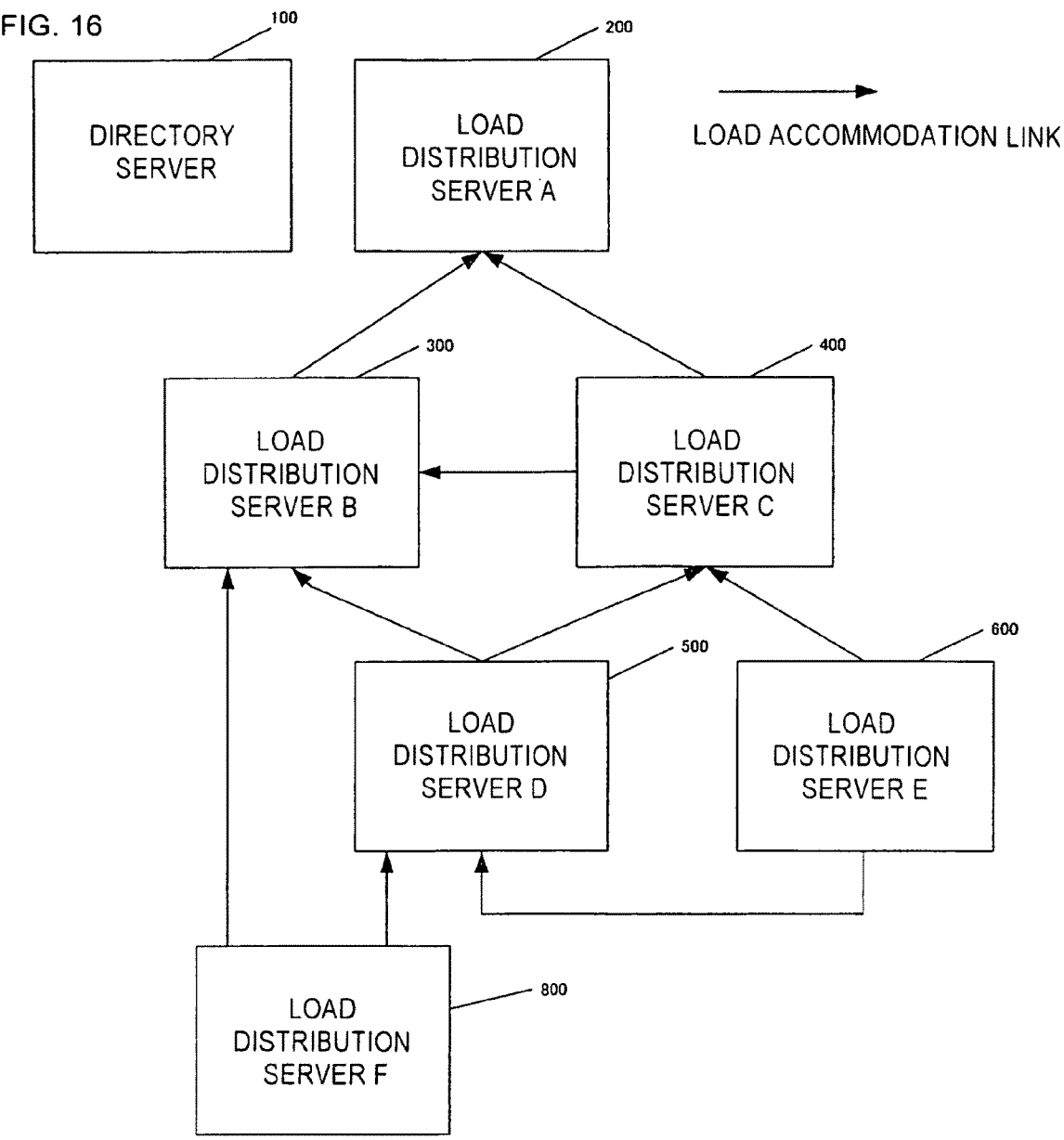
FIG. 16 is a block diagram that shows an example case where a problem probability is reported from four load distribution servers, and also shows the relations among six servers connected by load accommodation links.
Figure 17:
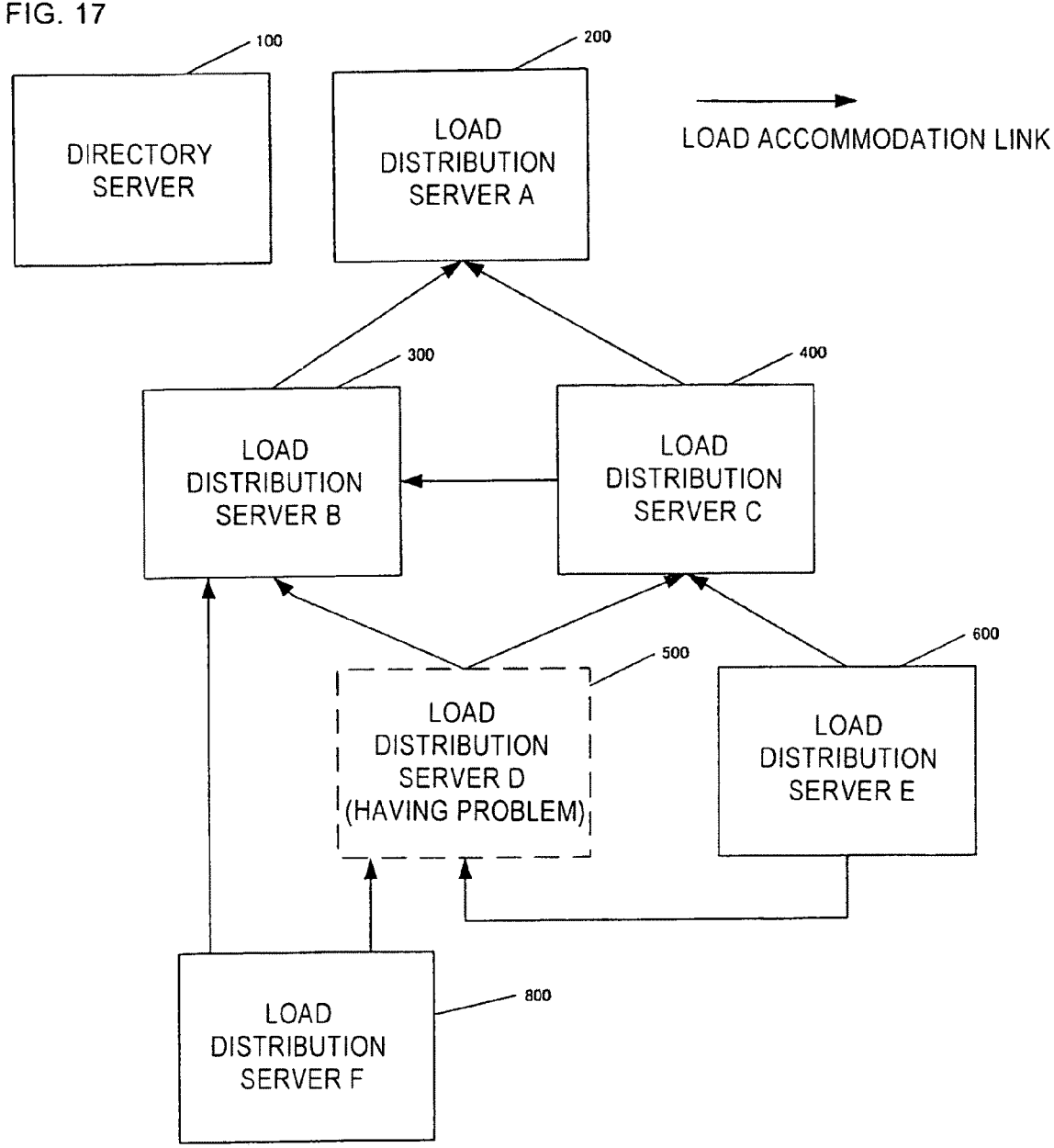
FIG. 17 is a block diagram that shows an example case where a problem probability is reported from four load distribution servers, and the problem is caused in the load distribution server D500.

As shown in FIG. 16, six load distribution servers have linkage relations. If a problem is caused in the load distribution server D500 in this situation, the situation turns into that illustrated in FIG. 17 (where the load distribution server D500 having a problem is indicated by a broken line).

At step B4 of the flowchart of FIG. 10, the problem information collecting unit 120 confirms that a problem has been caused in the load distribution server D500 having the problem probability (or collects the problem probability information from each computer and identifies the computer having a problem). Among the four servers having reported the problem probability, first as for the load distribution server B300, the information indicating the number of links (three, which is the number obtained by subtracting the number of links (one) with the load distribution server D500 having the problem from the total number of links prior to the problem occurrence), the server names of the load distribution server A200, the load distribution server C400, and a load distribution server F 800 on the other ends of the links, and "IN" as the IN/OUT type with respect to the load distribution server D500 having the problem is sent to the problem information analyzing unit 130. Also, as for the load distribution server C400, the information indicating the number of links (three), the server names of the load distribution server A200, the load distribution server B300, and the load distribution server E600 on the other ends of the links, and "IN" as the IN/OUT type with respect to the load distribution server D500 having the problem is sent to the problem information analyzing unit 130. Further, as for the load distribution server E600, the information indicating the number of links (one), the server name of the load distribution server C400 on the other end of the link, and "OUT" as the IN/OUT type with respect to the load distribution server D500 having the problem is sent to the problem information analyzing unit 130. Lastly, as for the load distribution server F 800, the information indicating the number of links (one), the server name of the load distribution server B300 on the other end of the link, and "OUT" as the IN/OUT type with respect to the load distribution server D500 having the problem is sent to the problem information analyzing unit 130.

When the determination of step D2 of the flowchart of FIG. 12 is performed, the result is "YES", as the link types of two of the links are "IN" while the link types of the other two are "OUT".

Figure 18:
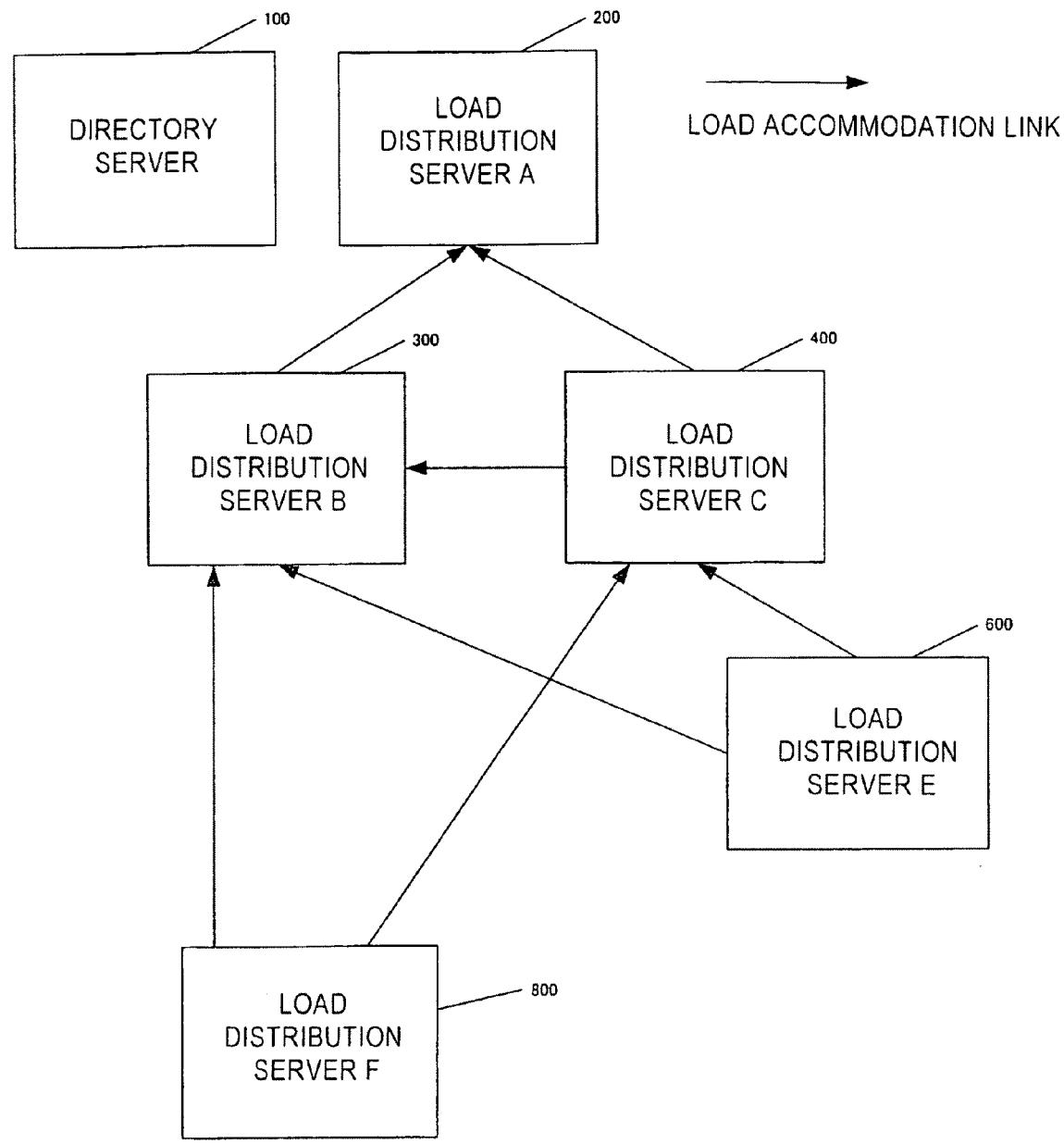
FIG. 18 is a block diagram that shows an example case where a problem probability is reported from four load distribution servers, and also shows the relations among the load accommodation links after a recovery from the problem in the load distribution server D500.

The determination result of step D3 of the flowchart of FIG. 12 is "YES", and the two load distribution servers E600 and F 800 of "OUT" in IN/OUT type can actively put links to the two load distribution servers B300 and C400 of "IN" in IN/OUT type without any overlapping with the existing links, as shown in FIG. 18. Accordingly, the problem information analyzing unit 130 requests the load distribution server E600 to actively put a load accommodation link to the load distribution server B300, and requests the load distribution server F 800 to actively put a load accommodation link to the load distribution server C400.

After load accommodation links are formed as above, the situation turns into that illustrated in FIG. 18. The load accommodation link managing unit 630 of the load distribution server E600 adds the information indicating the server name and IP address of the load distribution server B300, and "OUT" as the IN/OUT type to the table thereof. The load accommodation link managing unit 330 of the load distribution server B300 adds the information indicating the server name and IP address of the load distribution server E600, and "IN" as the IN/OUT type to the table thereof.

The load accommodation link managing unit of the load distribution server F 800 adds the information indicating the server name and IP address of the load distribution server C400, and "OUT" as the IN/OUT type to the table thereof. The load accommodation link managing unit 430 of the load distribution server B300 adds the information indicating the server name and IP address of the load distribution server E, and "IN" as the IN/OUT type to the table thereof.

The problem information analyzing unit 130 of the directory server 100 notifies the load distribution server B300, the load distribution server C400, the load distribution server E600, and the load distribution server F 800 that the problem in the load distribution server D500 has been confirmed. Each load accommodation link managing unit then deletes the row related to the load distribution server D500 from each corresponding table.

After that, according to B12 of the flowchart of FIG. 10, the problem information analyzing unit 130 instructs the flag management table managing unit 110 to switch the link completion flag in the flag management table to "OFF" with respect to the load distribution server D500 determined to be problematic.

The flag management table managing unit 110 then switches the link completion flag of the load distribution server D500 to "OFF", according to the instruction to switch the link completion flag in the flag management table to "OFF". At this point, the operation to recover from a problem comes to an end, and the situation turns into that illustrated in FIG. 18. Although the number of links of each of the load distribution servers E600 and F temporarily becomes one, it becomes two after the recovery. Accordingly, even if a problem is caused in a load distribution server, the connectivity among the load distribution servers is maintained.

Next, an example case where the number of links of a node having a problem is four or where the determination result of step BY of the flowchart of FIG. 10 is "YES", and an example case where the determination result of step D2 of the flowchart of FIG. 12 is "NO" and the determination result of step D9 of the flowchart of FIG. 12 is "YES" are described.

Figure 19:
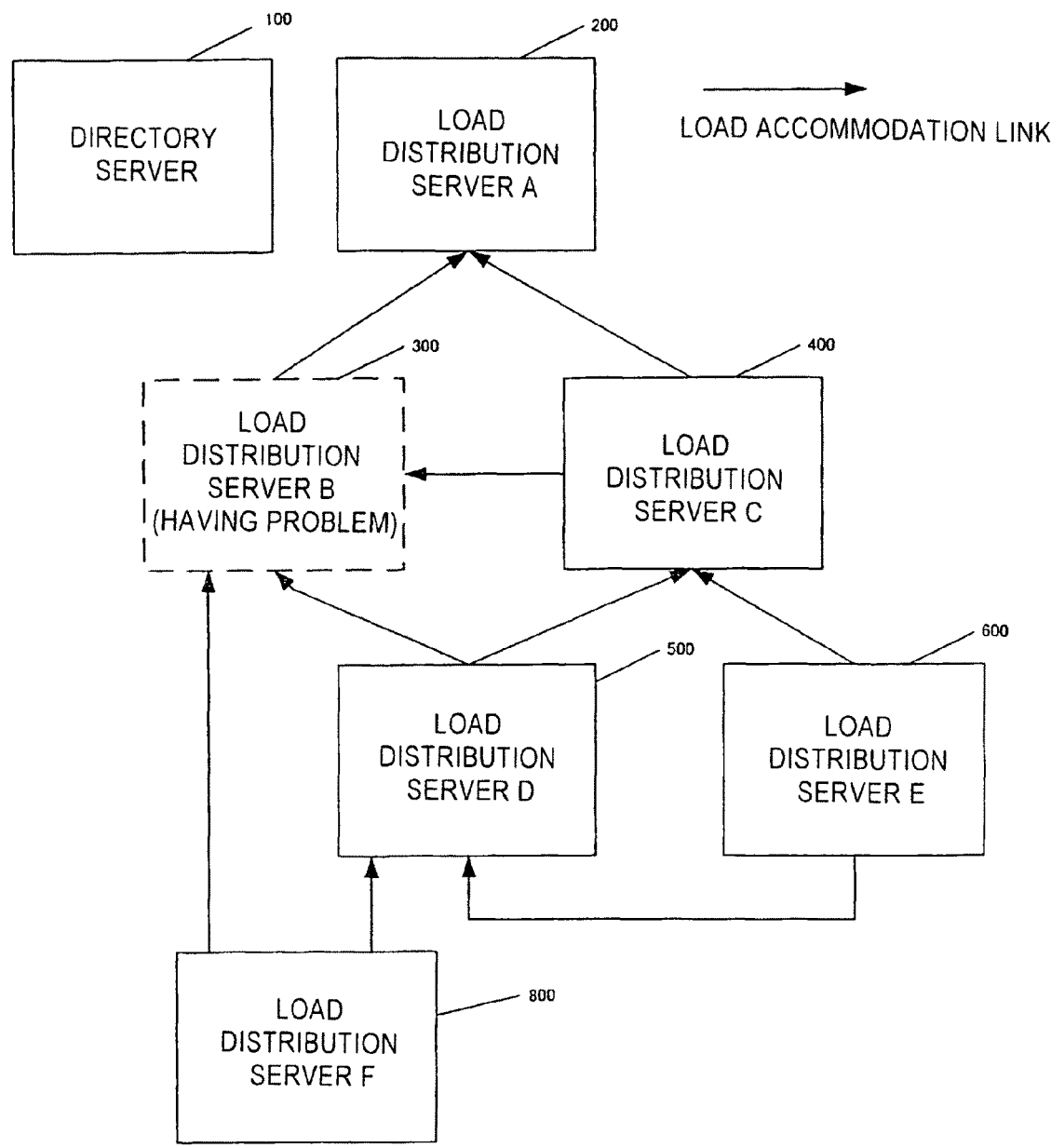
FIG. 19 is a block diagram that shows an example case where a problem probability is reported from four load distribution servers, and the problem is caused in the load distribution server B300.

Links are formed among six load distribution servers, as shown in FIG. 16. If a problem is caused in the load distribution server B300 in this situation, the situation turns into that illustrated in FIG. 19. In FIG. 19, the load distribution server B300 having a problem is indicated by a broken line.

In this case, the load distribution server A200, the load distribution server C400, the load distribution server D500, and the load distribution server F 800 transmit the problem probability information to the problem information collecting unit 120 of the directory server 100.

At step B4 of the flowchart of FIG. 10, the problem information collecting unit 120 confirms that a problem has been caused in the load distribution server B300 having the problem probability. Among the four servers having reported the problem probability, first as for the load distribution server A200, the information indicating the number of links (one), the server name of the load distribution server C400 on the other end of the link, and "IN" as the IN/OUT type with respect to the load distribution server B300 having the problem is sent to the problem information analyzing unit 130. Also, as for the load distribution server C400, the information indicating the number of links (three), the server names of the load distribution server A200, the load distribution server C400, and the load distribution server E600 on the other ends of the links, and "OUT" as the IN/OUT type with respect to the load distribution server B300 having the problem is sent to the problem information analyzing unit 130. Further, as for the load distribution server D500, the information indicating the number of links (three), the server names of the load distribution server C400, the load distribution server D500, and the load distribution server E600 on the other ends of the links, and "OUT" as the IN/OUT type with respect to the load distribution server B300 having the problem is sent to the problem information analyzing unit 130. Lastly, as for the load distribution server F 800, the information indicating the number of links (one), the server name of the load distribution server D500 on the other end of the link, and "OUT" as the IN/OUT type with respect to the load distribution server B300 having the problem is sent to the problem information analyzing unit 130.

When the problem information analyzing unit 130 performs the determination of step D2 of the flowchart of FIG. 12, the result is "NO", as the link type of one of the links is "IN" while the link types of the other three are "OUT".

When the problem information analyzing unit 130 next performs the determination of step D9 of the flowchart of FIG. 12, the result is "YES", as the link type of one of the links is "IN" while the link types of the other three are "OUT".

At step D10 of the flowchart of FIG. 12, the problem information analyzing unit 130 determines whether there is a combination in which a link from one of the load distribution servers of the OUT link type can be put to the load distribution server of the IN link type without any overlapping with the existing links, and also determines whether a link can be formed between the other two load distribution servers of "OUT" in IN/OUT type without any overlapping with the existing links.

In this case, the determination result is "YES", and a load accommodation link from the load distribution server D500 of the OUT link type can be put to the load distribution server A200 of the IN link type without any overlapping with the existing links. As for the remaining two load distribution servers of the OUT link type, a load accommodation link can also be formed between the load distribution server F 800 and the load distribution server C400.

According to step D11 of the flowchart of FIG. 12, the problem information analyzing unit 130 instructs the load distribution server D500 to put a link to the load distribution server A200. The problem information analyzing unit 130 then compares the number of links (one) of the load distribution server F 800 with the number of links (three) of the load distribution server C400. The problem information analyzing unit 130 sets the load distribution server F 800 with the smaller number of links as "OUT", and instructs the load distribution server F 800 to actively put a link to the load distribution server C400.

The problem information analyzing unit 130 of the directory server 100 notifies the load distribution server A200, the load distribution server C400, the load distribution server E600, and the load distribution server F 800 that the problem in the load distribution server B300 has been confirmed. Each load accommodation link managing unit then deletes the row related to the load distribution server B300 from each corresponding table.

After that, according to B12 of the flowchart of FIG. 10, the problem information analyzing unit 130 instructs the flag management table managing unit 110 to switch the link completion flag in the flag management table to "OFF" with respect to the load distribution server B300 determined to be problematic.

Figure 20:
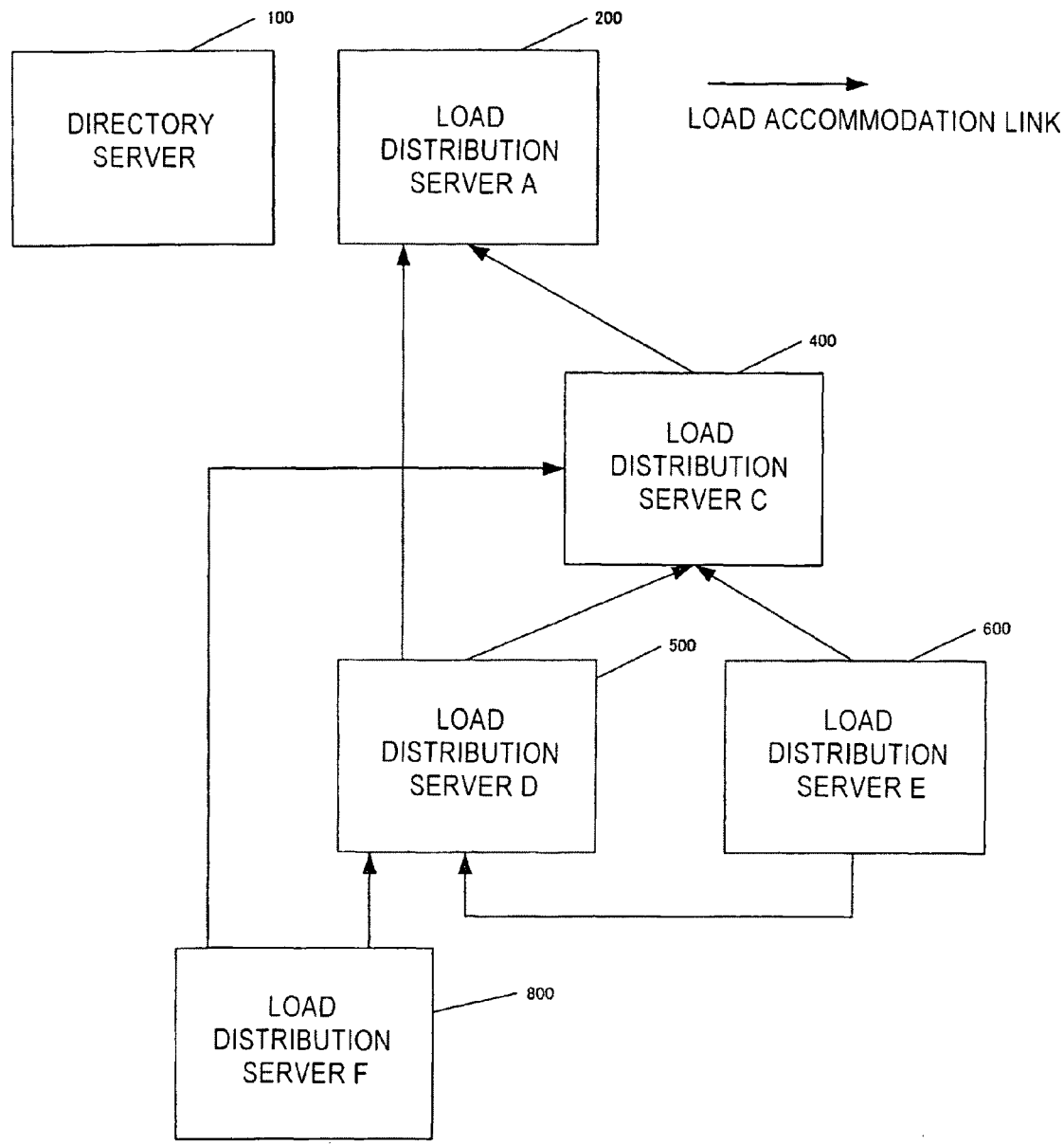
FIG. 20 is a block diagram that shows an example case where a problem probability is reported from four load distribution servers, and also shows the relations among the load accommodation links after a recovery from the problem in the load distribution server B300.
Figure 21:
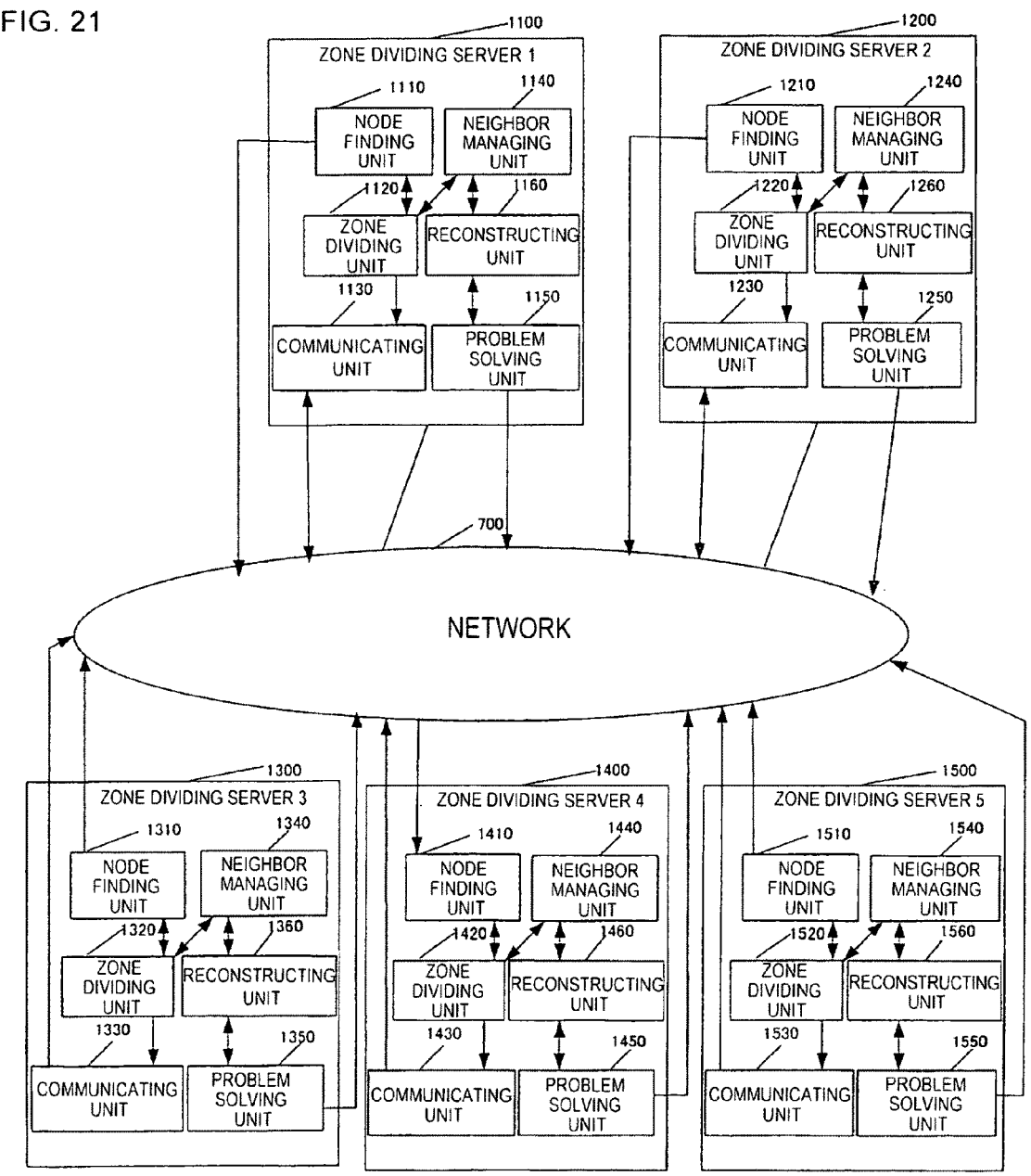
FIG. 21 is a block diagram showing the structure of a distribution infrastructure system of a reference.
Figure 22:
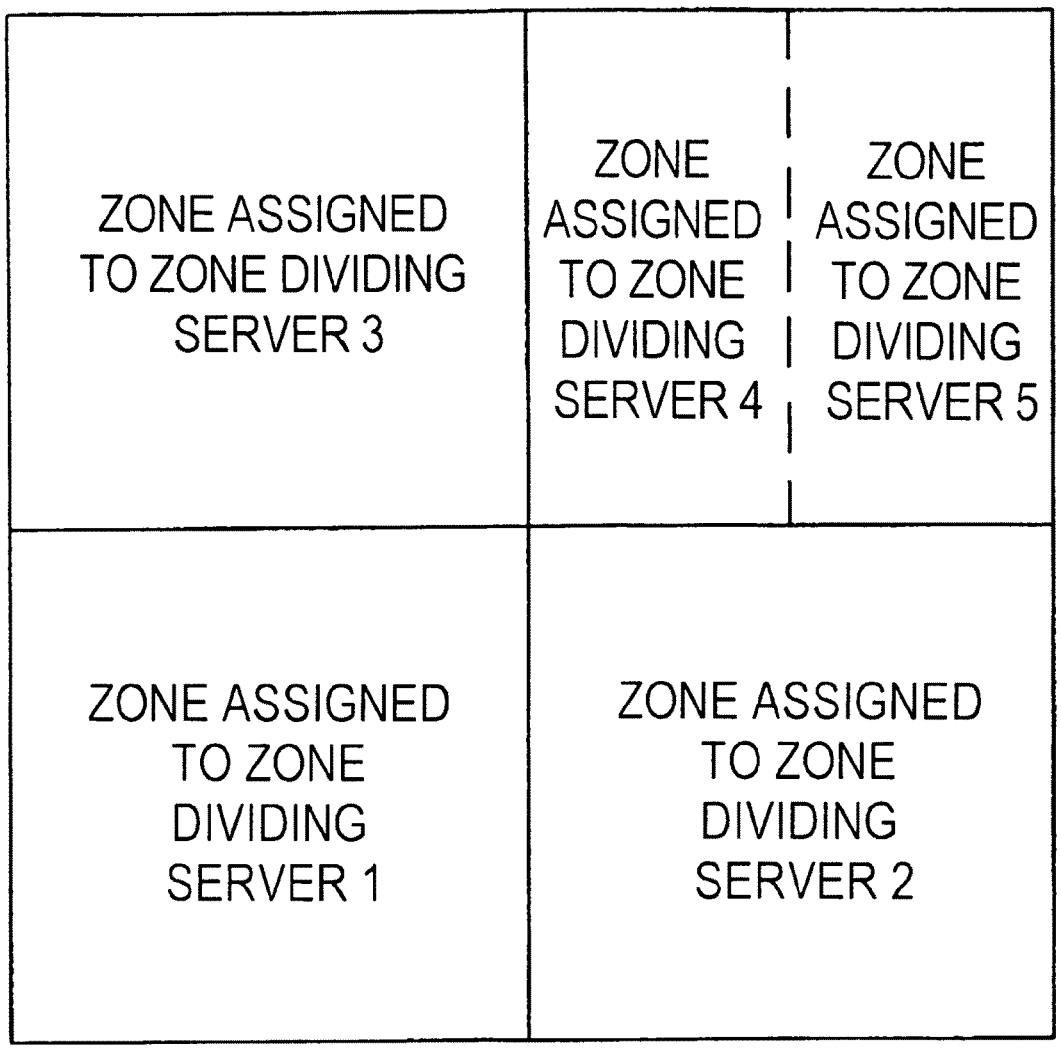
FIG. 22 shows the zones assigned to the respective servers where a server as a component is added to the distribution infrastructure system of the reference.
Figure 23:
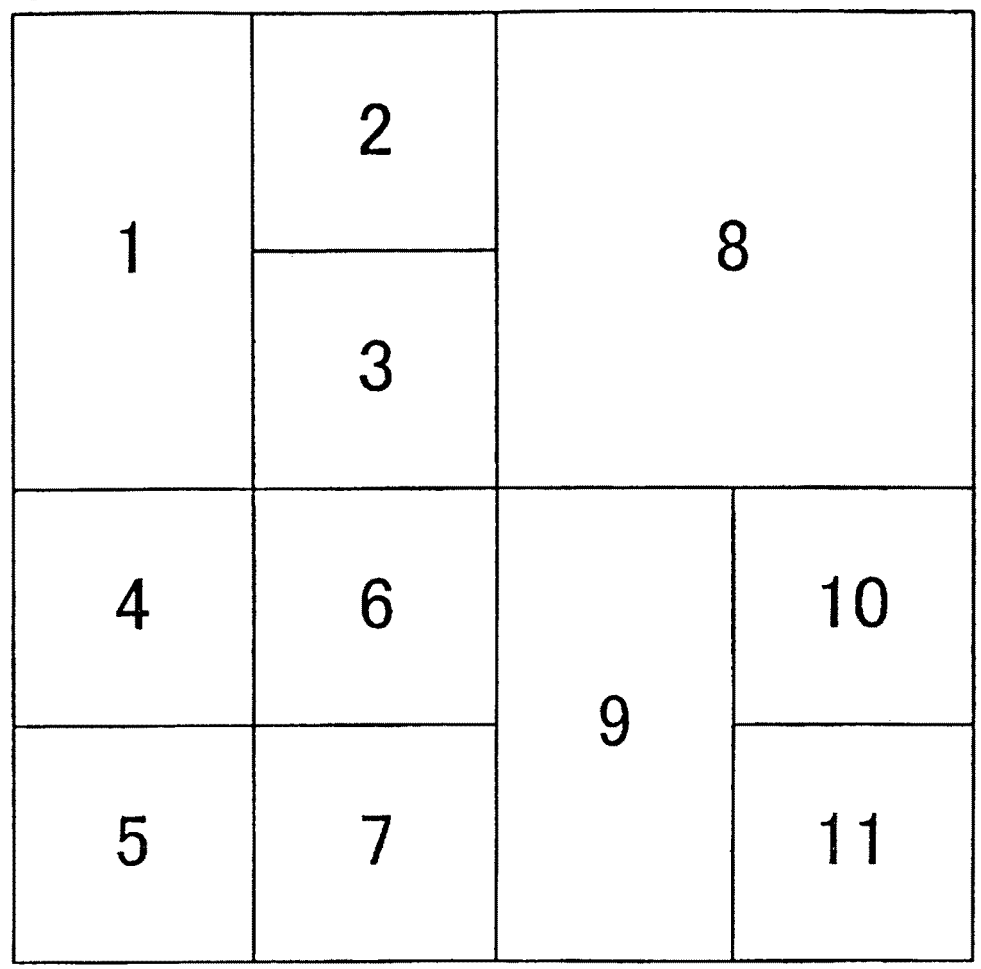
FIG. 23 shows the zones assigned to the respective servers before a server as a component leaves the distribution infrastructure system of the reference.
Figure 24:
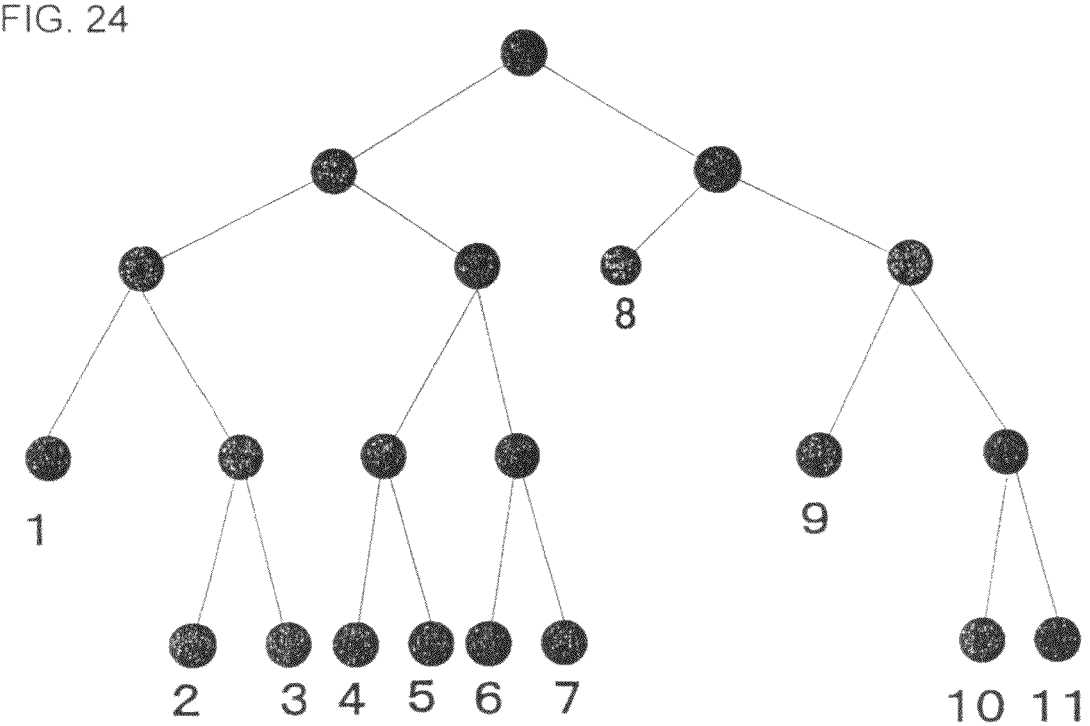
FIG. 24 shows a binary tree that represents the relationships among the servers as the components in the distribution infrastructure system of the reference.

The flag management table managing unit 110 then switches the link completion flag of the load distribution server B300 to "OFF", according to the instruction to switch the link completion flag in the flag management table to "OFF". At this point, the operation to recover from a problem comes to an end, and the situation turns into that illustrated in FIG. 20. Although the number of links of each of the load distribution servers A200 and F 800 temporarily becomes one, it becomes two after the recovery. Accordingly, even if a problem is caused in a load distribution server, the connectivity among the load distribution servers is maintained.

As described above, the embodiment of the present invention provides a computer link method for linking computers that cooperate with one another. According to the computer link method, each of the computers is characteristically capable of forming active links to other computers and passive links from other computers, and is linked to or from other computers so as to satisfy the maximum active link number that is the upper limit on the number of active links, and the maximum link number that is the upper limit on the number of links to or from other computers.

Here, a computer to newly join may refer to a flag management table that stores the computer names and addresses of the respective computers, and flags indicating whether links are acceptable. The computer then forms links to computers that can accept links.

The maximum active link number may be two, and the maximum link number may be four.

When a problem is caused in one of the computers, the computers linked to or from the computer having the problem may re-form links with two or more computers.

Also, when a problem is caused in one of the computers, the computers linked to or from the computer with the problem may re-form links with other computers while maintaining the relationship between the active links and the passive links, if it is possible to maintain the relationship between the active links and the passive links as before.

When a problem is caused in one of the computers, the computers linked to or from the computer with the problem may re-form links while avoiding forming more than one link with the same computer.

Also, when a problem is caused in one of the computers, the computer having the smallest number of links among the computers linked to or from the computer with the problem may preferentially re-form a link.

Each of the computers may exchange load information with another linked computer on a regular basis, and find and report a problem probability in the computer. The information about the problem probability may be collected from each of the computers so that the computer with the problem can be identified. The computers linked to or from the identified computer may re-form links according to a re-link method determined based on the collected information.

In a case where a problem probability is found by a computer that inquires about the load information and exchanges the load information with other computers, the computer name of the computer with the problem probability, the number of links excluding the link with the computer, the link type indicating whether the link with the computer is active or passive, and the computer names of the other ends of the links may be reported as the information about the problem probability.

In a case where the load information about a computer on the other end of a load information inquiry is not received from the computer within a predetermined period of time, the computer that has inquired about the load information may determine that the computer on the other end of the load information inquiry has a problem probability, and may send the information about the problem probability.

In a case where the information about the problem probability in the same computer is reported from two or more computers within a predetermined period of time, the computer may be identified as a computer having the problem.

The embodiment of the present invention also provides a computer system that includes computers cooperating with one another. Each of the computers is characteristically capable of forming active links to other computers and passive links from other computers, and are linked to or from other computers so as to satisfy the maximum active link number that is the upper limit on the number of active links, and the maximum link number that is the upper limit on the number of the links to or from other computers.

Here, the computer system may include a flag management table that stores the computer names and addresses of the respective computers, and flags indicating whether links can be accepted. A computer to newly join may refer to the flag management table, and then form links to computers that can accept links.

The maximum active link number may be two, and the maximum link number may be four.

When a problem is caused in one of the computers, the computers linked to or from the computer having the problem may re-form links with two or more computers.

Also, when a problem is caused in one of the computers, the computers linked to or from the computer with the problem may re-form links with other computers while maintaining the relationship between the active links and the passive links, if it is possible to maintain the relationship between the active links and the passive links as before.

When a problem is caused in one of the computers, the computers linked to or from the computer with the problem may re-form links while avoiding forming more than one link with the same computer.

Also, when a problem is caused in one of the computers, the computer having the smallest number of links among the computers linked to or from the computer with the problem may preferentially re-form a link.

The computer system may further include: a load information exchanging unit that is provided in each of the computers, exchanges load information with other linked computers, and finds a problem probability; a problem information collecting unit that collects the information about the problem probability from the load information exchanging unit, and identifies the computer having the problem; and a problem information analyzing unit that determines a re-link method, based on the information collected by the problem information collecting unit. The computers linked to or from the identified computer may re-form links according to the re-link method determined by the problem information analyzing unit.

When the load information exchanging unit finds a problem probability, the problem information collecting unit may receive the information about the problem probability from a computer including the load information exchanging unit, with the information indicating the computer name of the computer with the problem probability, the number of links excluding the link with the computer, the link type indicating whether the link with the computer is active or passive, and the computer names of the other ends of the links.

In a case where the load information about a computer on the other end of a load information inquiry is not received from the computer within a predetermined period of time, the load information exchanging unit may determine that the computer has a problem probability, and transmit the information about the problem probability to the problem information collecting unit.

When receiving the information about the problem probability in a computer from more than one computer within a predetermined period of time, the problem information collecting unit may identify the computer as a computer with a problem. The problem information analyzing unit may then determine that the computers linked to or from the identified computer should form more than one link.

The respective computers may be load distribution servers that cooperate with one another and distribute loads.

The flag management table, the problem information collecting unit, and the problem information analyzing unit may be provided in the directory server.

The embodiment of the present invention also provides a computer that cooperates with other computers, and characteristically includes: an acquiring unit that acquires the computer names and addresses of the computers cooperating with the computer and the flags indicating whether links are acceptable, from a flag management table; and a load accommodation link managing unit that refers to the information acquired from the flag management table, and forms links with computers that can accept links. The load accommodation link managing unit is capable of forming active links to other computers and passive links from other computers, and is linked to or from other computers so as to satisfy the maximum active link number that is the upper limit on the number of active links, and the maximum link number that is the upper limit on the number of links with other computers.

Here, the maximum active link number may be two, and the maximum link number may be four.

The computer may further include: a load information exchanging unit that exchanges load information with other linked computers on a regular basis, to find a problem probability; and a communicating unit that outputs the information about the problem probability found by the load information exchanging unit to the outside. In response to a re-link instruction from the outside, the load accommodation link managing unit may re-form links with more than one computer.

In a case where the load information about a computer on the other end of a load information inquiry is not received from the computer within a predetermined period of time, the load information exchanging unit may determine that there is a problem probability in the computer.

When the load information exchanging unit finds a problem probability, the communicating unit may report the information about the problem probability, with the information indicating the computer name of the computer having the problem probability, the number of links excluding the links with the computer, the link type indicating whether the link with the computer is active or passive, and the computer names of the other ends of the current links.

The embodiment of the present invention also provides a computer that manages computers cooperating with one another, and characteristically includes: a flag management table managing unit that stores a flag management table storing the computer names and addresses of the computers cooperating with one another and flags indicating whether links can be accepted, and transmits information stored in the flag management table in accordance with a request from a computer to newly cooperate; a problem information collecting unit that collects the information about a problem probability from each of the computers, and identifies the computer having a problem; and a problem information analyzing unit that determines a method for re-forming a link to or from a computer linked to or from the identified computer, based on the information about the problem probability collected by the problem information collecting unit, and notifies the computer of the method.

The problem information collecting unit may receive the information about the problem probability, with the information indicating the computer name of the computer having the problem probability, the number of links excluding the link with the computer, the link type indicating whether the link with the computer is active or passive, and the computer names of the other ends of the links.

When receiving the information about the problem probability in a computer from two or more computers within a predetermined period of time, the problem information collecting unit may identify the computer as a computer having a problem. The problem information analyzing unit may determine that the computers linked to or from the identified computer should form more than one link.

The problem information analyzing unit may also determine that the computers linked to or from the identified computer should form more than one link, so as to satisfy the maximum active link number that is the upper limit on the number of active links from the computer to other computers, and the maximum link number that is the upper limit on the number of links between the computer and other computers.

The maximum active link number may be two, and the maximum link number may be four.

The problem information analyzing unit may also determine that the computers linked to or from the identified computer should re-form links with other computers while maintaining the relationship between the active links and passive links, if it is possible to maintain the relationship between the active links and passive links as before.

The problem information analyzing unit may also determine that the computers linked to or from the identified computer should re-form links while avoiding forming more than one link with the same computer.

The problem information analyzing unit may also determine that the computer having the smallest number of links among the computers linked to or from the identified computer should preferentially re-form links.

The embodiment of the present invention also provides a program that characteristically causes a computer to include: an acquiring unit that acquires the computer names and addresses of computers cooperating with the computer and flags indicating whether links are acceptable, from a flag management table; and a load accommodation link managing unit that refers to the information acquired from the flag management table, and forms links with computers that can accept links. The load accommodation link managing unit is capable of forming active links to other computers and passive links from other computers, and is linked to or from other computers so as to satisfy the maximum active link number that is the upper limit on the number of active links, and the maximum link number that is the upper limit on the number of links with other computers.

Here, the program may cause the computer to function so that the maximum active link number becomes two, and the maximum link number becomes four.

The program may also cause the computer to further include: a load information exchanging unit that exchanges load information with other linked computers on a regular basis, to find a problem probability; and a communicating unit that outputs the information about the problem probability found by the load information exchanging unit to the outside. In response to a re-link instruction from the outside, the load accommodation link managing unit may re-form links with more than one computer.

The program may also cause the computer to function so that, in a case where the load information about a computer on the other end of a load information inquiry is not received from the computer within a predetermined period of time, the load information exchanging unit determines that there is a problem probability in the computer.

The program may also cause the computer to function so that, when the load information exchanging unit finds a problem probability, the communicating unit reports the information about the problem probability, with the information indicating the computer name of the computer having the problem probability, the number of links excluding the links with the computer, the link type indicating whether the link with the computer is active or passive, and the computer names of the other ends of the current links.

The embodiment of the present invention also provides a program that causes a computer to function as: a flag management table managing unit that stores a flag management table storing the computer names and addresses of computers cooperating with one another and flags indicating whether links can be accepted, and transmits information stored in the flag management table in accordance with a request from a computer to newly cooperate; a problem information collecting unit that collects the information about a problem probability from each of the computers, and identifies the computer having a problem; and a problem information analyzing unit that determines a method for re-forming a link to or from a computer linked to or from the identified computer, based on the information about the problem probability collected by the problem information collecting unit, and notifies the computer of the method.

The program may cause the computer to function so that the problem information collecting unit receives the information about the problem probability, with the information indicating the computer name of the computer having the problem probability, the number of links excluding the link with the computer, the link type indicating whether the link with the computer is active or passive, and the computer names of the other ends of the links.

The program may also cause the computer to function so that, when receiving the information about the problem probability in a computer from two or more computers within a predetermined period of time, the problem information collecting unit identifies the computer as a computer having a problem. The problem information analyzing unit then determines that the computers linked to or from the identified computer should form more than one link.

The program may also cause the computer to function so that the problem information analyzing unit determines that the computers linked to or from the identified computer should form more than one link, so as to satisfy the maximum active link number that is the upper limit on the number of active links from the computer to other computers, and the maximum link number that is the upper limit on the number of links between the computer and other computers.

The program may cause the computer to function so that the maximum active link number becomes two, and the maximum link number becomes four.

The program may also cause the computer to function so that the problem information analyzing unit determines that the computers linked to or from the identified computer should re-form links with other computers while maintaining the relationship between the active links and passive links, if it is possible to maintain the relationship between the active links and passive links as before.

The program may also cause the computer to function so that the problem information analyzing unit determines that the computers linked to or from the identified computer should re-form links while avoiding forming more than one link with the same computer.

The program may also cause the computer to function so that the problem information analyzing unit determines that the computer having the smallest number of links among the computers linked to or from the identified computer should preferentially re-form links.

The present invention may be applied to a computer system in which load distribution servers cooperate with one another to distribute loads, a computer system that constructs an inter-node network, and the likes.

Although the present invention has been described so far with reference to an embodiment, the present invention is not limited to the above embodiment. Various modifications obvious to those skilled in the art within the scope of the invention can be made to the structures and details of the present invention.

Each of the components of the present invention may not necessarily be an independent structure. Instead, two or more components may be formed as one component, one component may be formed with two or more components, one component may be part of another component, part of one component may overlap with part of another component, or the like.

This application is based on Japanese patent application No. 2008-064083, filed on Mar. 13, 2008, the entire content of which is incorporated hereinto by reference.

The invention claimed is:

1. A computer link method for linking a plurality of computers cooperating with one another, said method comprising:
    linking each computer among said computers to another computer among said computers;
    comparing load information indicating a processing load on said computer with load information indicating a processing load on said another computer;
    forming at least two load accommodation links for each of said computers for transferring at least part of an operation being performed from one of said computers with a larger processing load indicated by said load information to another of said computers with a smaller processing load indicated by said load information;
    generating problem information indicating a probability that a problem is caused in one of link computers having said load accommodation links with said computer, based on said load information;
    identifying a problematic computer having a problem by collecting said problem information from each of said computers;
    analyzing said problem information collected, and issuing a re-link instruction to said computer having said load accommodation link with said problematic computer to re-form said load accommodation link; and
    re-forming said load accommodation link by said computer in accordance with said re-link instruction,
    wherein said re-link instruction instructs said computer to form a new active link from said computer to another of said computers, which said computer has formed an active link from said computer to said problematic computer, and which said another of said computers have formed a passive link from said problematic computer to said another of said computers,
    wherein said active link of said computer comprises a load accommodation link from said computer to another of said computers, which said computer actively forms, and
    wherein said passive link of said computer comprises a load accommodation link from said another of computers to said computer, which said computer passively forms.

2. The computer link method according to claim 1, wherein management is performed, with two being an upper limit on a number of active links formed from said computer to said another computer among said load accommodation links.

3. The computer link method according to claim 2, wherein management is performed, with four being an upper limit on a number of said load accommodation links including passive links formed from said another computer to said computer.

4. The computer link method according to claim 1, further comprising:
    generating and storing a specified value flag for each of said computers, said specified value indicating whether one of said load accommodation links can be further accepted; and
    forming one of said load accommodation links after confirming that said specified value flag generated by said computer on the other end of said link indicates that said one load accommodation link can be further accepted at the time of formation of said one load accommodation link.

5. The computer link method according to claim 4, wherein said specified value flags generated an collected and unified, and are stored as a flag management table.

6. The computer link method according to claim 1, wherein, when a plurality of pieces of said problem information about one of said computers are collected within a predetermined period of time, said one computer is identified as said problematic computer.

7. The computer link method according to claim 1, wherein said computer having said load accommodation link with said problematic computer re-forms a plurality of said load accommodation links.

8. The computer link method according to claim 1, wherein said computer having said load accommodation link with said problematic computer maintains the number of active links and the number of passive links said computer has formed prior to problem occurrence.

9. The computer link method according to claim 1, wherein a plurality of said computers having said load accommodation links with said problematic computer re-form said load accommodation links with said other computers different from one another.

10. The computer link method according to claim 1, wherein, among said computers having said load accommodation links with said problematic computer, said computer having the smallest number of said load accommodation links preferentially re-forms said load accommodation link.

11. The computer link method according to claim 1, wherein said problem information is generated to contain at least computer names of said link computers, a computer name of a problem probability computer with a probability of said problem, the number of normal links that is obtained by subtracting the number of said computer with said problem probability from the number of said link computers, and a link type that indicates whether said load accommodation link between said computer and said computer with said problem probability is an active link or a passive link.

12. The computer link method according to claim 1, wherein, when said computer does not receive said load information about one of said link computers from said one link computer within a predetermined period of time, said computer generates said problem information.

13. A computer system comprising
a plurality of computers that cooperate with one another, each of said computers includes:
a load information exchanging unit that is connected to another computer among the computers excluding said computer, compares load information indicating a processing load on said computer with load information indicating a processing load on said another computer, and forms a load accommodation link for each of said computers transferring at least part of an operation being performed from one of said computers with a larger processing load indicated by said load information to one of said computers with a smaller processing load indicated by said load information;
a load accommodation link managing unit that causes said load information exchanging unit to form at least two or more of said load accommodation links,
a problem information communicating unit that generates and reports problem information based on said load information, said problem information indicating that there is a probability that a problem is caused in one of link computers forming said load accommodation links with said computer;
a problem information collecting unit that collects said problem information from said load information exchanging unit of each of said computers, and identifies a problematic computer having a problem; and
a problem information analyzing unit that analyzes said problem information collected by said problem information collecting unit, and issues a re-link instruction to the load information exchanging unit forming said load accommodation link with said problematic computer, to re-form said load accommodation link,
wherein said load information exchanging unit re-forms said load accommodation unit in accordance with said re-link instruction issued by said problem information analyzing unit,
wherein said re-link instruction instructs said computer to form a new active link from said computer to another of said computers, which said computer has formed an active link from said computer to said problematic computer, and which said another of said computers have formed a passive link from said problematic computer to said another of said computers,
wherein said active link of said computer comprises a load accommodation link from said computer to another of said computers, which said computer actively forms, and
wherein said passive link of said computer comprises a load accommodation link from said another of said computers to said computer, which said computer passively forms.

14. The computer system according to claim 13, wherein said load accommodation link managing unit performs management, with two being an upper limit on a number of active links formed from said computer to said another computer among said load accommodation links.

15. The computer system according to claim 14, wherein said load accommodation link managing unit performs management, with four being an upper limit on a number of said load accommodation links including passive links formed from said another computer to said computer.

16. The computer system according to claim 13, wherein said load accommodation link managing unit generates a specified value flag that indicates whether said computer can further accept said load accommodation link, and stores said specified value flag into a storage unit,
when causing said load information exchanging unit to form said load accommodation link, said load accommodation link managing unit confirms that said specified value flag generated by said another computer on the other end of said link indicates that said load accommodation link can be accepted, and causes said load information exchanging unit to form said load accommodation link.

17. The computer system according to claim 16, wherein said storage unit stores a flag management table that is formed by collecting and unifying said specified value flags generated by said computers.

18. The computer system according to claim 13, wherein, when collecting a plurality of pieces of said problem information about one of said computers, said problem information collecting unit identifies said one computer as said problematic computer.

19. The computer system according to claim 13, wherein said problem information analyzing unit causes said load information exchanging unit having said load accommodation link with said problematic computer, to re-form a plurality of said load accommodation links.

20. The computer system according to claim 13, wherein said problem information analyzing unit causes said load information exchanging unit having said load accommodation link with said problematic computer, to maintain the number of active links and the number of passive links said load information exchanging unit has formed prior to problem occurrence.

21. The computer system according to claim 13, wherein said problem information analyzing unit causes a plurality of said load information exchanging units having said load accommodation links with said problematic computers to re-form said load accommodation links with said computers different from one another.

22. The computer system according to claim 13, wherein said problem information analyzing unit preferentially causes said load information exchanging unit having the smallest number of said load accommodation links among a plurality of said load information exchanging units having said load accommodation links with said problematic computer, to re-form said load accommodation link.

23. The computer system according to claim 13, wherein said problem information communicating unit reports said problem information that contains at least computer names of said link computers, a computer name of a computer with a probability of said problem, the number of normal links that is obtained by subtracting the number of said computer with said problem probability from the number of said link computers, and a link type that indicates whether said load accommodation link between said computer and said computer with problem probability is an active link or a passive link.

24. The computer system according to claim 13, wherein, when said load information about one of said link computers is not received from said one link computer within a predetermined period of time, said problem information communicating unit generates said problem information.

25. The computer system according to claim 13, wherein said problem information collecting unit and said problem information analyzing unit are provided in a directory server that manages said computers.

26. A computer that cooperates with another computer, comprising:
   a load information exchanging unit that is connected to said another computer, compares load information indicating a processing load on said computer with load information indicating a processing load on said another computer, and forms a load accommodation link for each of said computers transferring at least part of an operation being performed from a computer with a larger processing load indicated by said load information to a computer with a smaller processing load indicated by said load information; and
   a load accommodation link managing unit that causes said load information exchanging unit to form at least two or more of said load accommodation links,
   a problem information communicating unit that generates problem information based on said load information, with said problem information indicating that there is a probability that a problem is caused in one of link computers forming said load accommodation links with said computer, and outputs said problem information generated to outside,
   wherein said load information exchanging unit re-forms said load accommodation link in accordance with a re-link instruction from said outside,
   wherein said re-link instruction instructs said computer to form a new active link from said computer to another of said computers, which said computer has formed an active link from said computer to said problematic computer, and which said another of said computers have formed a passive link from said problematic computer to said another of said computers,
   wherein said active link of said computer comprises a load accommodation link from said computer to another of said computers, which said computer actively forms, and
   wherein said passive link of said computer comprises a load accommodation link from said another of computers to said computer, which said computer passively forms.

27. The computer according to claim 26, wherein said load accommodation link managing unit performs management, with two being an upper limit on a number of active links formed from said computer to said another computer among said load accommodation links.

28. The computer according to claim 27, wherein said load accommodation link managing unit performs management, with four being an upper limit on a number of said load accommodation links including passive links formed from said another computer to said computer.

29. The computer according to claim 26, wherein
   said load accommodation link managing unit generates a specified value flag that indicates whether said computer can further accept said load accommodation link, and stores said specified value flag into a storage unit,
   when causing said load information exchanging unit to form said load accommodation link, said load accommodation link managing unit confirms that said specified value flag generated by said another computer on the other end of said link indicates that said load accommodation link can be accepted, and causes said load information exchanging unit to form said load accommodation link.

30. The computer according to claim 26, wherein said problem information communicating unit reports said problem information that contains at least computer names of said link computers, a computer name of a computer with a probability of said problem, the number of normal links that is obtained by subtracting the number of said computer with said problem probability from the number of said link computers, and a link type that indicates whether said load accommodation link between said computer and said computer with problem probability is an active link or a passive link.

31. The computer according to claim 26, wherein, when said load information about one of said link computers is not received from said one link computer within a predetermined period of time, said problem information communicating unit generates said problem information.

32. A directory server that manages a plurality of computers cooperating with one another, said directory server comprising:
   a storage unit that stores a flag management table formed by collecting and unifying specified value flags each indicating whether each corresponding one of said computers can further accept a load accommodation link, said load accommodation link for each of said computers transferring at least part of an operation being performed by one of said computers from one of said computers with a larger processing load to one of said computers with a smaller processing load among said computers;
   a problem information collecting unit that collects problem information from each of said computers, and identifies a problematic computer having a problem, said problem information indicating that there is a probability that a problem is caused in one of link computers forming said load accommodation links among said computers; and
   a problem information analyzing unit that analyzes said problem information collected by said problem information collecting unit, and issues a re-link instruction to said computer having said load accommodation link with said problematic computer, to re-form said load accommodation link, wherein said re-link instruction instructs said computer to form a new active link from said computer to another of said computers, which said computer has formed an active link from said computer to said problematic computer, and which said another of said computers have formed a passive link from said problematic computer to said another of said computers, wherein said active link of said computer comprises a load accommodation link from said computer to another of said computers, which said computer actively forms, and wherein said passive link of said computer comprises a load accommodation link from said another of computers to said computer, which said computer passively forms.

33. The directory server according to claim 32, wherein the problem information collecting unit collects said problem information that contains at least computer names of said link computers, a computer name of a computer having a probability of said problem, the number of normal links that is obtained by subtracting the number of said computer with said problem probability from the number of said link computers, and a link type that indicates whether said load accommodation link between said computer having generated said problem information and said computer with said problem probability is active or passive.

34. The directory server according to claim 32, wherein, when collecting a plurality of pieces of said problem information about one of said computers within a predetermined period of time, said problem information collecting unit identifies said one computer as said problematic computer.

35. The directory server according to claim 32, wherein said problem information analyzing unit causes said computer having said load accommodation link with said problematic computer to re-form a plurality of said load accommodation links.

36. The directory server according to claim 32, wherein said problem information analyzing unit causes said computer having said load accommodation link with said problematic computer to maintain the number of active ones of said load accommodation links and the number of passive ones of said load accommodation links said computer has formed prior to problem occurrence.

37. The directory server according to claim 32, wherein said problem information analyzing unit causes a plurality of said computers having said load accommodation links with said problematic computer to re-form said load accommodation links with different ones of said computers from one another.

38. The directory server according to claim 32, wherein said problem information analyzing unit preferentially causes said computer having a smallest number of said load accommodation links among a plurality of said computers having said load accommodation links with said problematic computer, to re-form said load accommodation link.

39. A non-transitory storage medium that stores a program to be executed by a computer that cooperates with another computer, said storage medium storing a program that causes said computer to:
connect to said another computer, compare load information indicating a processing load on said computer with load information indicating a processing load on said another computer, and form at least two load accommodation links for each of said computers for transferring at least part of an operation being performed from a computer with a larger processing load indicated by said load information to a computer with a smaller processing load indicated by said load information;
generate problem information based on said load information, said problem information indicating that thew is a probability that a problem is caused in one of link computers forming said load accommodation links with said computer,
output said problem information generated to outside; and
re-form said load accommodation link in accordance with a re-link instruction from said outside,
wherein said re-link instruction instructs said computer to form a new active link from said computer to another of said computers, which said computer has formed an active link from said computer to said problematic computer, and which said another of said computers have formed a passive link from said problematic computer to said another of said computers,
wherein said active link of said computer comprises a load accommodation link from said computer to another of said computers, which said computer actively forms, and
wherein said passive link of said computer comprises a load accommodation link from said another of computers to said computer, which said computer passively forms.

40. The non-transitory storage medium according to claim 39, which stores a program that causes said computer to perform management, with two being an upper limit on the number of active links formed from said computer to said another computer among said load accommodation links.

41. The non-transitory storage medium according to claim 40, which stores a program that causes said computer to perform management, with four being an upper limit on the number of said load accommodation links including passive links formed from said another computer to said computer.

42. The non-transitory storage medium according to claim 39, which stores a program that causes said computer to:
generate a specified value flag that indicates whether said computer can further accept said load accommodation link; and
confirm that said specified value flag generated by said computer on the other end of said link indicates that said load accommodation link can be accepted, and form said load accommodation link.

43. The non-transitory storage medium according to claim 39, which stores a program that causes said computer to report said problem information that contains at least computer names of said link computers, a computer name of a computer with a probability of said problem, the number of normal links that is obtained by subtracting the number of said computer with said problem probability from the number of said link computers, and a link type that indicates whether said load accommodation link between said computer and said problem probability computer is an active link or a passive link.

44. The non-transitory storage medium according to claim 39, which stores a program that causes said computer to generate said problem information, when said load information about one of said link computers is not received from said one link computer within a predetermined period of time.

45. A non-transitory storage medium that stores a program to be executed by a server that manages a plurality of computers cooperating with one another, said storage medium storing a program that causes said server to:

store a flag management table formed by collecting and unifying specified value flags each indicating whether each corresponding one of said computers can further accept a load accommodation link, said load accommodation link transferring at least part of an operation being performed from one of said computers with a larger processing load indicated by load information to one of said computers with a smaller processing load indicated by said load information, said load information indicating said processing load being compared with one another among said computers.

46. The non-transitory storage medium according to claim 45, which stores a program that causes said server to:

collect problem information from each of said computers, and identify a problematic computer having a problem, said problem information indicating that there is a probability that a problem is caused in one of link computers forming said load accommodation links among said computers; and analyze said problem information collected, and issue a re-link instruction to said computer having said load accommodation link with said problematic computer, to re-form said load accommodation link.

47. The non-transitory storage medium according to claim 46, which stores a program that causes said server to collect said problem information that contains at least computer names of said link computers, a computer name of a computer having a probability of said problem, the number of normal links that is obtained by subtracting the number of said computer with said problem probability from the number of said link computers, and a link type that indicates whether said load accommodation link between said computer having generated said problem information and said problem probability computer is active or passive.

48. The non-transitory storage medium according to claim 46, which stores a program that causes said server to identify one of said computers as said problematic computer, when a plurality of pieces of said problem information about said one computer are collected within a predetermined period of time.

49. The non-transitory storage medium according to claim 46, which stores a program that causes said server to cause said computer having said load accommodation link with said problematic computer to re-form a plurality of said load accommodation links.

50. The non-transitory storage medium according to claim 46, which stores a program that causes said server to cause said computer having said load accommodation link with said problematic computer to maintain the number of active ones of said load accommodation links and the number of passive ones of said load accommodation links said computer has formed prior to problem occurrence.

51. The non-transitory storage medium according to claim 46, which stores a program that causes said server to cause a plurality of said computers having said load accommodation links with said problematic computer to re-form said load accommodation links with said computers different from one another.

52. The non-transitory storage medium according to claim 46, which stores a program that causes said server to preferentially cause said computer having the smallest number of said load accommodation links among a plurality of said computers having said load accommodation links with said problematic computer, to re-form said load accommodation link.

53. A computer system comprising:

a plurality of computers that cooperate with one another, each of said computers includes:

a load information exchanger that is connected to another computer among said computers excluding said computer, compares load information indicating a processing load on said computer with load information indicating a processing load on said another computer, and forms a load accommodation link for each of said computers transferring at least part of an operation being performed from one of said computers with a larger processing load indicated by said load information to one of said computers with a smaller processing load indicated by said load information;

a load accommodation link manager that causes said load information exchanger to form at least two or more of said load accommodation links; and a problem information communicator that generates problem information based on said load information, with said problem information indicating that there is a probability that a problem is caused in one of link computers forming said load accommodation links with said computer, and outputs said problem information generated to outside, wherein said load information exchanger re-forms said load accommodation link in accordance with a re-link instruction from said outside, wherein said re-link instruction instructs said computer to form a new active link from said computer to another of said computers, which said computer has formed an active link from said computer to said problematic computer, and which said another of said computers have formed a passive link from said problematic computer to said another of said computers, wherein said active link of said computer comprises a load accommodation link from said computer to another of said computers, which said computer actively forms, and wherein said passive link of said computer comprises a load accommodation link from said another of computers to said computer, which said computer passively forms.

54. A computer that cooperates with another computer, comprising:

a load information exchanger that is connected to said another computer, compares load information indicating a processing load on said computer with load information indicating a processing load on said another computer, and forms a load accommodation link for each of said computers transferring at least part of an operation being performed from a computer with a larger processing load indicated by said load information to a computer with a smaller processing load indicated by said load information;

a load accommodation link manager that causes said load information exchanger to form at least two or more of said load accommodation links; and a problem information communicator that generates problem information based on said load information, with said problem information indicating that there is a probability that a problem is caused in one of link computers forming said load accommodation links with said computer, and outputs said problem information generated to outside, wherein said load information exchanger re-forms said load accommodation link in accordance with a re-link instruction from said outside, wherein said re-link instruction instructs said computer to form a new active link from said computer to another of said computers, which said computer has formed an active link from said computer to said problematic computer, and which said another of said computers have formed a passive link from said problematic computer to said another of said computers, wherein said active link of said computer comprises a load accommodation link from said computer to another of said computers, which said computer actively forms, and wherein said passive link of said computer comprises a load accommodation link from said another of computers to said computer, which said computer passively forms.

55. A directory server that manages a plurality of computers cooperating with one another, said directory server comprising:

a storage that stores a flag management table formed by collecting and unifying specified value flags each indicating whether each corresponding one of said computers can further accept a load accommodation link, said load accommodation link for each of said computers transferring at least part of an operation being performed by one of said computers from one of said computers with a larger processing load to one of said computers with a smaller processing load among said computers; and a storage that stores a flag management table formed by collecting and unifying specified value flags each indicating problem information based on said load accommodation link, with said problem information indicating that there is a probability that a problem is caused in one of link computers forming said load accommodation link with said computer, and outputs said problem information generated to outside, wherein said load information exchanger re-forms said load accommodation link in accordance with a re-link instruction from said outside, wherein said re-link instruction instructs said computer to form a new active link from said computer to another of said computers, which said computer has formed an active link from said computer to said problematic computer, and which said another of said computers have formed a passive link from said problematic computer to said another of said computers, wherein said active link of said computer comprises a load accommodation link from said computer to another of said computers, which said computer actively forms, and wherein said passive link of said computer comprises a load accommodation link from said another of computers to said computer, which said computer passively forms.

* * * * *